United States Patent
Lee et al.

(10) Patent No.: US 10,236,724 B2
(45) Date of Patent: *Mar. 19, 2019

(54) METHOD OF GENERATING LOAD VARIATION FOR DETECTING WIRELESS POWER RECEIVING UNIT IN WIRELESS CHARGING, AND WIRELESS POWER RECEIVING UNIT

(71) Applicant: Samsung Electronics Co., Ltd., Gyeonggi-do (KR)

(72) Inventors: Kyung-Woo Lee, Seoul (KR); Kang-Ho Byun, Gyeonggi-do (KR); Chong-Min Lee, Seoul (KR); Hee-Won Jung, Gyeonggi-do (KR); Min-Cheol Ha, Gyeonggi-do (KR); Seung-Woo Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/704,885

(22) Filed: Sep. 14, 2017

(65) Prior Publication Data

US 2018/0006486 A1 Jan. 4, 2018

Related U.S. Application Data

(63) Continuation of application No. 14/297,251, filed on Jun. 5, 2014, now Pat. No. 9,806,554.

(30) Foreign Application Priority Data

Jun. 5, 2013 (KR) .................. 10-2013-0065009

(51) Int. Cl.
  *H02J 50/00* (2016.01)
  *H02J 50/12* (2016.01)
  (Continued)

(52) U.S. Cl.
  CPC .............. *H02J 50/12* (2016.02); *H02J 5/005* (2013.01); *H02J 7/025* (2013.01); *H02J 50/40* (2016.02);
  (Continued)

(58) Field of Classification Search
  CPC .......... H02J 7/025; H02J 7/0047; H02J 50/80; H02J 50/40; H02J 5/005
  See application file for complete search history.

(56) References Cited

U.S. PATENT DOCUMENTS 3,737,782 A * 6/1973 Pierce .................... H04B 17/19
 340/539.1
5,100,153 A * 3/1992 Welte ................... A63H 17/006
 124/29

(Continued)

FOREIGN PATENT DOCUMENTS

CN 101335470 12/2008
CN 100479292 4/2009

(Continued)

OTHER PUBLICATIONS

European Search Report dated Dec. 21, 2016 issued in counterpart application No. 14808428.8-1804, 8 pages.

(Continued)

*Primary Examiner* — Naum B Levin
(74) *Attorney, Agent, or Firm* — The Farrell Law Firm, P.C.

(57) ABSTRACT

A method of controlling a wireless power receiver. The method includes receiving, by a power receiver, power from a wireless power transmitter; receiving, from the wireless power transmitter, a time set value that is set for checking cross connection; in response to receiving the time set value, generating a power variation in the wireless power receiver by converting a load status from a first load status to a (Continued)

second load status; and maintaining the second load status for a time corresponding to the received time set value.

15 Claims, 21 Drawing Sheets

(51) Int. Cl.
*H02J 50/80* (2016.01)
*H02J 5/00* (2016.01)
*H02J 50/40* (2016.01)
*H02J 7/02* (2016.01)
*H02J 7/00* (2006.01)

(52) U.S. Cl.
CPC ............ *H02J 50/80* (2016.02); *H02J 7/0047* (2013.01); *H02J 2007/005* (2013.01)

(56) References Cited

U.S. PATENT DOCUMENTS

| | | | |
|---|---|---|---|
| 5,734,984 A * | 3/1998 | Reece | H04W 68/00 455/436 |
| 6,540,147 B2 | 4/2003 | Charrat | G06K 7/0008 235/487 |
| 6,972,662 B1 * | 12/2005 | Ohkawa | G06K 19/0723 340/10.1 |
| 7,577,180 B2 | 8/2009 | Boulton | |
| 7,605,496 B2 * | 10/2009 | Stevens | H02J 5/005 307/17 |
| 7,768,422 B2 | 8/2010 | Carmen, Jr. | |
| 8,026,694 B2 | 9/2011 | Kamijo | |
| 8,115,606 B2 | 2/2012 | Ha | |
| 8,175,661 B2 | 5/2012 | Park | |
| 8,208,973 B2 | 6/2012 | Mehta | |
| 8,344,688 B2 | 1/2013 | Yoda | |
| 8,450,877 B2 | 5/2013 | Baarman et al. | |
| 8,452,235 B2 * | 5/2013 | Kirby | H02J 7/025 455/41.1 |
| 8,498,237 B2 | 7/2013 | Corson | |
| 8,605,693 B2 | 12/2013 | So | |
| 8,667,452 B2 | 3/2014 | Verghese | |
| 8,872,386 B2 * | 10/2014 | Mach | H02J 5/00 307/104 |
| 8,929,957 B2 * | 1/2015 | Toncich | H02J 7/025 455/573 |
| 9,106,096 B2 * | 8/2015 | Kato | H02J 7/025 |
| 9,125,160 B2 | 9/2015 | Lee | |
| 9,144,013 B2 | 9/2015 | Kondabattini | |
| 9,231,413 B2 | 1/2016 | Ueno | |
| 9,344,155 B2 | 5/2016 | Moes | |
| 9,406,220 B2 | 8/2016 | Proud | |
| 9,660,478 B2 * | 5/2017 | Von Novak | H02J 7/025 |
| 9,806,554 B2 * | 10/2017 | Lee | H02J 5/005 |
| 2006/0270438 A1 * | 11/2006 | Choi | H04W 48/16 455/522 |
| 2007/0216392 A1 | 9/2007 | Stevens et al. | |
| 2007/0228833 A1 * | 10/2007 | Stevens | H02J 5/005 307/45 |
| 2009/0001932 A1 | 1/2009 | Kamijo et al. | |
| 2009/0284082 A1 | 11/2009 | Mohammadian | |
| 2009/0284220 A1 * | 11/2009 | Toncich | G06K 7/0008 320/108 |
| 2009/0286476 A1 | 11/2009 | Toncich et al. | |
| 2009/0322158 A1 * | 12/2009 | Stevens | H02J 5/005 307/104 |
| 2010/0151808 A1 | 6/2010 | Toncich | |
| 2010/0181961 A1 * | 7/2010 | Novak | H02J 5/005 307/104 |
| 2010/0201201 A1 * | 8/2010 | Mobarhan | H02J 5/005 307/104 |
| 2010/0248622 A1 | 9/2010 | Lyell Kirby | |
| 2011/0225305 A1 | 9/2011 | Vedantham | |
| 2011/0260549 A1 * | 10/2011 | Jung | H02J 7/0027 307/104 |
| 2012/0223589 A1 | 9/2012 | Low | |
| 2012/0235509 A1 | 9/2012 | Ueno et al. | |
| 2012/0306284 A1 | 12/2012 | Lee et al. | |
| 2013/0015813 A1 | 1/2013 | Kim et al. | |
| 2013/0154557 A1 | 6/2013 | Lee et al. | |
| 2013/0154558 A1 | 6/2013 | Lee et al. | |
| 2013/0162220 A1 | 6/2013 | Iijima | |
| 2013/0181665 A1 | 7/2013 | Lee | |
| 2013/0225077 A1 | 8/2013 | Schultz | |
| 2013/0257168 A1 | 10/2013 | Singh | |
| 2013/0285605 A1 | 10/2013 | Partovi | |
| 2014/0062395 A1 | 3/2014 | Kwon | |
| 2014/0159653 A1 * | 6/2014 | Von Novak | H04B 5/0031 320/108 |
| 2014/0192642 A1 | 7/2014 | Medapalli | |
| 2014/0197785 A1 | 7/2014 | Lee | |
| 2014/0217967 A1 | 8/2014 | Zeine | |
| 2014/0225439 A1 * | 8/2014 | Mao | H02M 3/3376 307/31 |
| 2014/0232199 A1 | 8/2014 | Jung | |
| 2014/0239732 A1 | 8/2014 | Mach | |
| 2014/0285141 A1 | 9/2014 | Lee | |
| 2014/0292095 A1 * | 10/2014 | Tsukamoto | H04B 5/0037 307/104 |
| 2014/0306657 A1 * | 10/2014 | Lundgren | H02J 50/80 320/108 |
| 2014/0333145 A1 | 11/2014 | Lee | |
| 2015/0015198 A1 * | 1/2015 | Okada | B60R 25/406 320/108 |
| 2015/0214775 A1 | 7/2015 | Lee | |
| 2015/0233990 A1 | 8/2015 | Lee | |
| 2016/0049826 A1 | 2/2016 | Lee | |
| 2016/0226298 A1 * | 8/2016 | Shimokawa | H02J 50/40 |
| 2016/0268815 A1 | 9/2016 | Lee | |

FOREIGN PATENT DOCUMENTS

| | | |
|---|---|---|
| EP | 2 348 600 | 7/2011 |
| WO | WO 2005/109597 | 11/2005 |

OTHER PUBLICATIONS

Chinese Office Action dated Apr. 25, 2017 issued in counterpart application No. 201480032135.4, 13 pages.

* cited by examiner

METHOD OF GENERATING LOAD VARIATION FOR DETECTING WIRELESS POWER RECEIVING UNIT IN WIRELESS CHARGING, AND WIRELESS POWER RECEIVING UNIT

PRIORITY

This continuation application claims priority under 35 U.S.C. § 120 to U.S. patent application Ser. No. 14/297,251 filed on Jun. 5, 2014 in the U.S. Patent and Trademark Office, now U.S. Pat. No. 9,806,554 issued on Oct. 31, 2017, which claims priority under 35 U.S.C. § 119(a) to a Korean Patent Application filed on Jun. 5, 2013 in the Korean Intellectual Property Office and assigned Serial No. 10-2013-0065009, the entire contents of each of which are incorporated herein by reference.

BACKGROUND

1. Field of the Invention

The present invention relates generally to a wireless charging network, and more particularly, to a method for generating a load variation used for detecting a wireless power receiving unit in wireless charging, allowing a wireless power transmitting unit to detect a wireless power receiving unit that has entered a wireless charging network.

2. Description of the Related Art

Mobile terminals such as a mobile phone, a Personal Digital Assistant (PDA), etc., are driven with rechargeable batteries, and the battery of the mobile terminal is charged using a separate charging apparatus. In general, the charging apparatus and the battery each have external contact terminals, and the charging apparatus and the battery are electrically connected to each other using the contact terminals.

However, since the contact terminal protrudes outward in such a contact type charging scheme, the contact terminal is easily contaminated by a rogue object and thus battery charging might not be performed correctly. Further, battery charging might also not be performed correctly when the contact terminal is exposed to moisture.

Recently, a wireless charging or a non-contact charging technology was developed and used for electronic devices to solve the above-mentioned problems.

Such a wireless charging technology employs wireless power transmission/reception, and corresponds to, for example, a system in which a battery can be automatically charged if the battery is laid on a charging pad without the need of a wired connection between the mobile phone and a separate charging connector. Examples of wireless charging technology include the wireless electrical toothbrush and the wireless electric shaver. Accordingly, electronic products are charged in a waterproof manner through wireless charging, and the portability of electronic products is increased since there is no need for a wired charging apparatus. Therefore, the number of technologies using wireless charging technology is expected to increase significantly, especially in the coming age of electric cars.

Wireless charging technology largely includes an electromagnetic induction scheme using a coil, a resonance scheme, and an RF/microwave radiation scheme for converting electrical energy to either an RF or microwave signal and transmitting the RF or microwave signal.

Presently, electromagnetic induction schemes are not mainstream, but it is expected that the day will come when all electronic products will be wirelessly charged, anytime and anywhere. Based on recent successful experiments on transmitting power wirelessly dozens of meters using microwaves, wired charging technology is expected to disappear in the near future for use at home and abroad.

A power transmission method using electromagnetic induction transmits electrical power between a primary coil and a secondary coil. When a magnet is moved in a coil, a current is induced in the coil according to the rate of change of the magnetic field. The induction current then generates a magnetic field at a transferring end to generate energy at a reception end. The phenomenon is referred to as magnetic induction, and the electric power transmission method using magnetic induction has a high energy transmission efficiency.

With respect to the resonance scheme, Prof. Soljacic of the Massachusetts Institute of Technology (MIT) announced a system in which electricity is wirelessly transferred using an electric power transmission principle of the resonance scheme based on a coupled mode theory even if a device to be charged is separated from a charging device by several meters (m). A wireless charging system of an MIT research team employed the concept of resonance (e.g., the tendency of a tuning fork oscillating at a particular frequency to cause a wine glass next to the tuning fork to oscillates at the same frequency to make an electromagnetic wave containing electrical energy resonate instead of making sounds resonate. The resonated electrical energy is transferred only when there is a device having a resonance frequency, and only the portion of the resonating electrical energy that is are being used is reabsorbed into an electromagnetic field instead of being broadcast. Therefore, the resonating electrical energy would not affect surrounding devices or people, unlike other electromagnetic waves.

There is a method for detecting a change in impedance in which a wireless power transmitting unit (PTU) determines that a wireless power receiving unit (PRU) is put thereon.

However, when detecting a load (i.e., an impedance), the PTU is very likely to falsely detect a change in impedance when a threshold for detecting a change in impedance is set too low. On the other hand, if the threshold for detecting a change in impedance is set too high, the PTU is very likely to fail to detect a change in impedance when an object's change in impedance is insignificant.

In addition, the PTU may not accurately detect a variation in load, if there is only a small change in impedance between a case where no PRU is put on the PTU and another case where a PRU is put on the PTU. In other words, the difference in impedance between the two cases should be sufficiently large in order for the PTU to accurately detect a variation in load.

In the conventional impedance detection method, a PTU may hardly detect a variation in load, because a change in power due to the variation in load is insignificant, even though a resistance varies when a PRU is put on the PTU. In addition, a point at which there is no change in reactance may exist on the PTU.

Therefore, there is a need for a method capable of accurately detecting a PRU when the PRU is placed on a PTU.

SUMMARY

The present invention has been made to address the above problems and disadvantages and to provide at least the advantages described below.

Accordingly, an aspect of the present invention is to provide a method and apparatus for generating a load variation used for detecting a wireless PRU in wireless charging, in which a dummy load is added to the wireless power receiving unit, allowing a wireless PTU to efficiently detect a load in accordance with a change in impedance.

In accordance with an aspect of the present invention, a method of controlling a wireless power receiver is provided. The method includes receiving, by a power receiver, power from a wireless power transmitter; receiving, from the wireless power transmitter, a time set value that is set for checking cross connection; in response to receiving the time set value, generating a power variation in the wireless power receiver by converting a load status from a first load status to a second load status; and maintaining the second load status for a time corresponding to the received time set value.

In accordance with another aspect of the present invention, a wireless power receiving is provided. The wireless power receiver includes a power receiver configured to receive power from a wireless power transmitter; a communication module configured to receive, from the wireless power transmitter, a time set value that is set for checking cross connection; and a controller configured to: generate a power variation in the wireless power receiver by converting a load status from a first load status to a second load status, and maintain the second load status for time corresponding to the received time set value.

In accordance with another aspect of the present invention, a method for controlling a wireless power transmitter is provided. The method includes transmitting a time set value that is set for checking cross connection to the wireless power receiver; detecting a load variation of the wireless power receiver; comparing the time set value with a load variation period; determining whether the wireless power receiver is cross-connected, based on the comparison result; and in response to determining that the wireless power receiver is cross-connected, transmitting a PRU control signal with a permission field indicating that the wireless power receiver is not permitted due to the cross connection.

In accordance with another aspect of the present invention, a wireless power transmitter is provided. The wireless power transmitter includes a communication module configured to transmit a time set value that is set for checking cross connection to a wireless power receiver; and a controller configured to: detect a load variation of the wireless power receiver, compare the time set value with a load variation period, determine whether the wireless power receiver is cross-connected, based on the comparison result, and in response to determining that the wireless power receiver is cross-connected, transmit, through the communication module, a PRU control signal with a permission field indicating that the wireless power receiver is not permitted due to the cross connection.

BRIEF DESCRIPTION OF THE DRAWINGS

The above and other aspects, features and advantages of the present invention will be more apparent from the following description taken in conjunction with the accompanying drawings, in which.

DETAILED DESCRIPTION

Hereinafter, embodiments of the present invention are described in detail it is to be noted that the same reference numbers are used throughout the drawings to refer to the same elements. The following description with reference to the accompanying drawings is provided to assist in a comprehensive understanding of embodiments of the present invention as defined by the claims and their equivalents. It includes various details to assist in that understanding but these are to be regarded as merely exemplary. Accordingly, those of ordinary skilled in the art will recognize that various changes and modifications of the embodiments of the present invention described herein can be made without departing from the scope and spirit of the present invention. In addition, descriptions of well-known functions and constructions may be omitted for clarity and conciseness.

The terms and words used in the following description and claims are not limited their dictionary meanings, but, are merely used to enable a clear and consistent understanding of the present invention. Accordingly, it should be apparent to those skilled in the art that the following description of embodiments of the present invention is provided for illustration purpose only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

First, reference will be made to FIGS. 1 to 11, to describe the concept of the wireless charging system to which embodiments of the present invention are applicable. Next, reference will be made to FIGS. 12 to 25, to describe in detail methods for generating a load variation according to various embodiments of the present invention.

Figure 1:
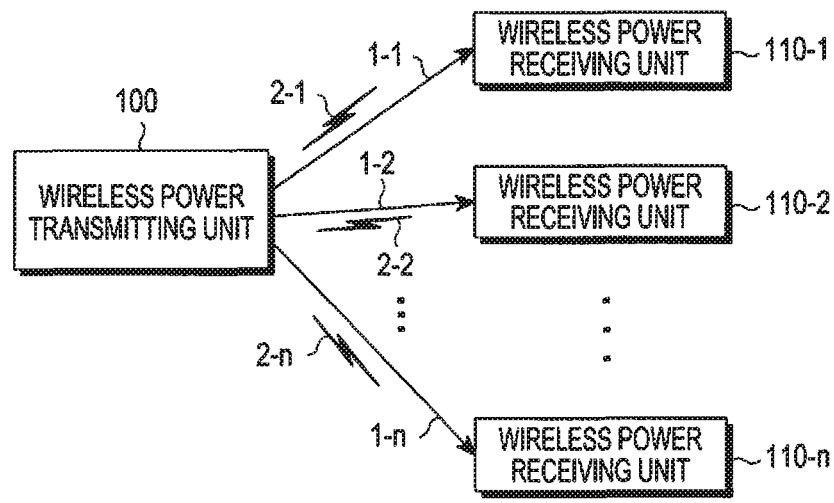
FIG. 1 is a block diagram which illustrates a wireless charging system.

FIG. 1 illustrates a wireless charging system.

As shown in FIG. 1, the wireless charging system includes a wireless power transmitting unit 100 and one or more wireless power receiving units 110-1, 110-2, . . . , and 110-*n*.

The wireless power transmitting unit 100 wirelessly transmits power 1-1, 1-2, . . . , and 1-*n* to the one or more wireless power receiving units 110-1, 110-2, . . . , and 110-*n*, respectively. The wireless power transmitting unit 100 wirelessly transmits the power 1-1, 1-2, . . . , and 1-*n* only to the wireless power receiving units authorized through a preset authentication process.

The wireless power transmitting unit 100 forms wireless connections with the wireless power receiving units 110-1, 110-2, . . . , and 110-*n*. For example, the wireless power transmitting unit 100 transmits wireless power to the wireless power receiving units 110-1, 110-2, . . . , and 110-*n* through electromagnetic waves.

The one or more wireless power receiving units 110-1, 110-2, . . . , and 110-*n* wirelessly receive power from the wireless power transmitting unit 100 to charge batteries inside the wireless power receiving units 110-1, 110-2, . . . , and 110-*n*. Further, the one or more wireless power receiving units 110-1, 110-2, . . . , and 110-*n* transmits messages 2-1, 2-2, . . . , and 2-*n* including a request for wireless power transmission, information required for reception of wireless power, state information of the wireless power receiving units 110-1, 110-2, . . . , and 110-*n* and information (that is, control information) for controlling the wireless power transmitting unit 100 to the wireless power transmitting unit 100. Similarly, the wireless power transmitting unit 100 transmits a message including state information of the wireless power transmitting unit 100 and information (that is, control information) for controlling the wireless power receiving units 110-1, 110-2, . . . , and 110-*n* to the wireless power receiving units 110-1, 110-2, . . . , and 110-*n*.

Further, each of the wireless power receiving units 110-1, 110-2, . . . , and 110-*n* transmits a message indicating a charging state to the wireless power transmitting unit 100.

The wireless power transmitting unit 100 includes a display unit such as a display, and displays a state of each of the wireless power receiving units 110-1, 110-2, and 110-*n* based on the message received from each of the wireless power receiving units 110-1, 110-2, . . . , and 110-*n*. Further, the wireless power transmitting unit 100 also displays a time expected to be spent until each of the wireless power receiving units 110-1, 110-2, . . . , and 110-*n* is completely charged.

The wireless power transmitting unit 100 transmits a control signal (or control message) for disabling a wireless charging function of each of the one or more wireless power receiving units 110-1, 110-2, . . . , and 110-*n*. The wireless power receiving units having received the disable control signal of the wireless charging function from the wireless power transmitting unit 100 disable the wireless charging function.

Figure 2:
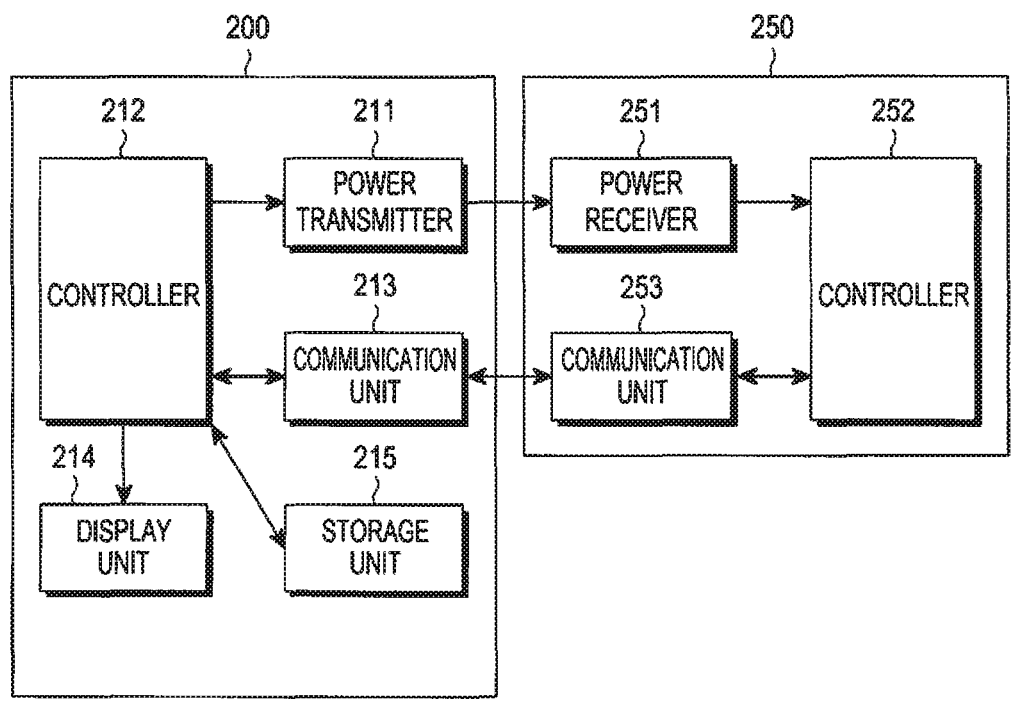
FIG. 2 is a block diagram which illustrates a wireless power transmitting unit and a wireless power receiving unit according to an embodiment of the present invention.

FIG. 2 illustrates a wireless power transmitting unit and a wireless power receiving unit according to an embodiment of the present invention.

As illustrated in FIG. 2, the wireless power transmitting unit 200 includes at least a power transmitter 211, a controller 212, a communication unit 213, a display unit 214, and a storage unit 215. Further, the wireless power receiving unit 250 includes a power receiver 251, a controller 252, and a communication unit 253.

The power transmitter 211 supplies power which is required by the wireless power transmitting unit 200, and wirelessly provides power to the wireless power receiving unit 250. The power transmitter 211 supplies power in an Alternating Current (AC) waveform type, or converts power in a Direct Current (DC) waveform type to the power in the AC waveform type by using an inverter, and then supplies the power in the AC waveform type. The power transmitter 211 is implemented in a form of an embedded battery or in a form of a power receiving interface so as to receive the power from outside thereof and supply the power to the other components. It will be easily understood by those skilled in the art that the power transmitter 211 is not limited if it supplies power of constant alternate current waves.

The controller 212 controls overall operations of the wireless power transmitting unit 200. The controller 212 controls overall operations of the wireless power transmitting unit 200 by using an algorithm, a program, or an application which is required for a control and reads from the storage unit 215. The controller 212 may be implemented in a form of a CPU, a microprocessor, a mini computer and the like.

The communication unit 213 communicates with the wireless power receiving unit 250. The communication unit 213 receives power information from the wireless power receiving unit 250. Here, the power information includes at least one of a capacity of the wireless power receiving unit 250, a residual amount of the battery, a number of times of charging, an amount of use, a battery capacity, and a proportion of the remaining battery capacity. Further, the communication unit 213 transmits a signal of controlling a charging function in order to control the charging function of the wireless power receiving unit 250. The signal of controlling the charging function may be a control signal for controlling the power receiver 251 of the wireless power receiving unit 250 so as to enable or disable the charging function. More specifically, the power information may include information on an insertion of a wireless charging terminal, a transition from a Stand Alone (SA) mode to a Non-Stand Alone (NSA) mode, error state release and the like.

The communication unit 213 receives a signal from another wireless power transmitting unit (not shown) as well as from the wireless power receiving unit 250.

The controller 212 displays a state of the wireless power receiving unit 250 on a display unit 214 based on the message received from the wireless power receiving unit 250 through the communication unit 213. Further, the controller 212 also displays a time expected to be spent until the wireless power receiving unit is completely charged on the display unit 214.

Figure 3:
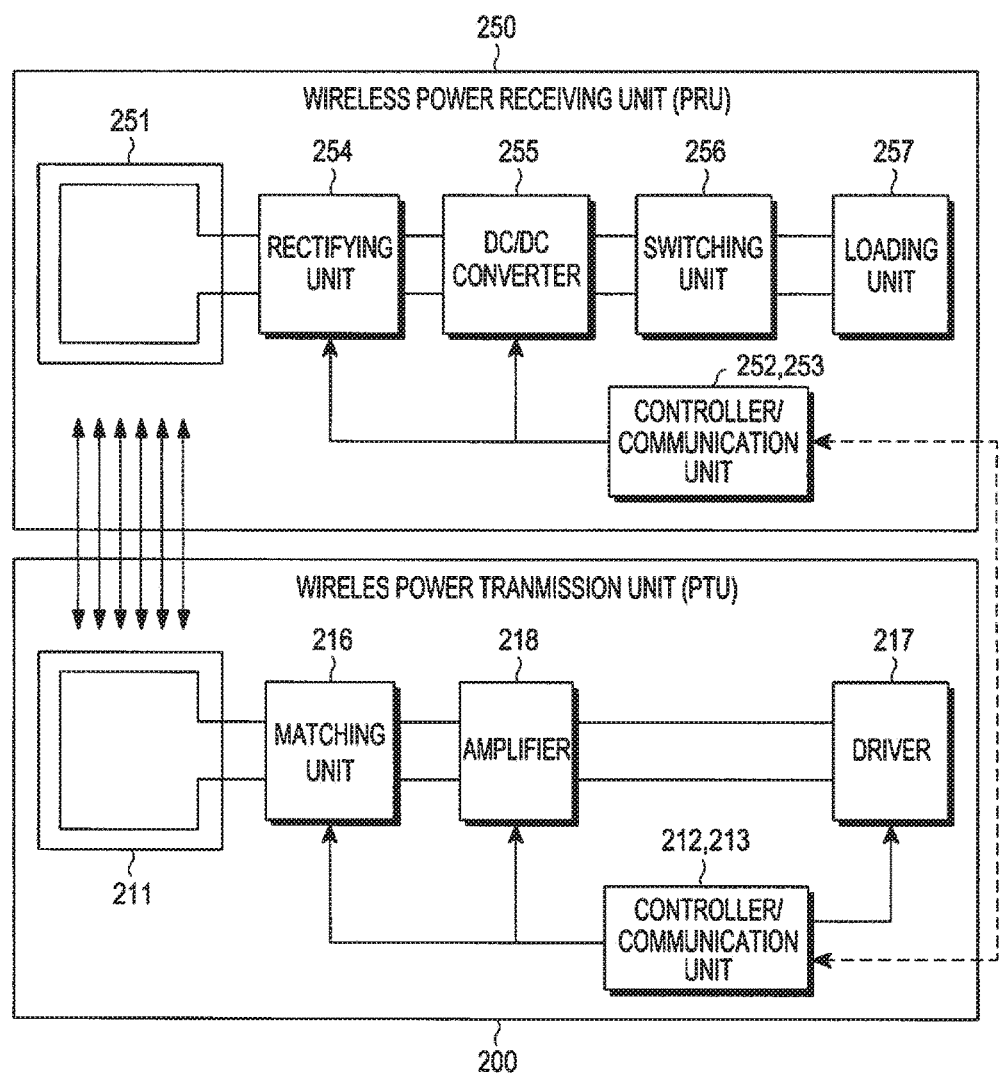
FIG. 3 is a block diagram illustrating a wireless power transmitting unit and a wireless power receiving unit according to an embodiment of the present invention.

FIG. 3 is a block diagram illustrating the wireless power transmitting unit 200 and the wireless power receiving unit 250 according to an embodiment of the present invention.

As illustrated in FIG. 3, the wireless power transmitting unit 200 includes the power transmitter 211, the controller/communication unit (Multipoint Control Unit (MCU) & Out-of-band Signaling) 212/213, a driver (Power Supply) 217, an amplifier (Power Amp) 218, and a matching unit (Matching Circuit) 216. The wireless power receiving unit 250 includes the power receiver 251, the controller/communication unit 252/253, a DC/DC converter 255, a switching unit (Switch) 256, and a loading unit (Client Device Load) 257.

The driver 217 outputs DC power having a preset voltage value. The voltage value of the DC power output by the driver 217 is controlled by the controller/communication unit 212/213.

The DC power output from the driver 217 is output to the amplifier 218, which amplifies the DC power by a preset gain. Further, the amplifier 218 converts DC power to AC power based on a signal input from the controller/communication unit 212/213. Accordingly, the amplifier 218 outputs AC power.

The matching unit 216 performs impedance matching. For example, the matching unit 216 adjusts impedance viewed from the matching unit 216 to control output power to be high efficient or high output power. The matching unit 216 also adjusts impedance based on a control of the controller/communication unit 212/213. The matching unit 216 includes at least one of a coil and a capacitor. The controller/communication unit 212/213 controls a connection state with at least one of the coil and the capacitor, and accordingly, performs impedance matching.

The power transmitter 211 transmits input AC power to the power receiver 251. The power transmitter 211 and the power receiver 251 are implemented by resonant circuits having the same resonance frequency. For example, the resonance frequency may be 6.78 MHz.

The controller/communication unit 212/213 communicates with the controller/communication unit 252/253 of the wireless power receiving unit 250, and performs communication (Wireless Fidelity (WiFi), ZigBee, or Bluetooth (BT)/Bluetooth Low Energy (BLE)), for example, with a bi-directional 2.4 GHz frequency.

The power receiver 251 receives charging power.

The rectifying unit 254 rectifies wireless power received by the power receiver 251 in the form of direct current, and is implemented in a form of bridge diode. The DC/DC converter 255 converts the rectified electric current into a predetermined gain. For example, the DC/DC converter 255 converts the rectified electric current so that a voltage of an output end 259 becomes 5V. Meanwhile, a minimum value and a maximum value of the voltage which can be applied is preset for a front end 258 of the DC/DC converter 255.

The switching unit 256 connects the DC/DC converter 255 to the loading unit 257. The switching unit 256 is held in an on/off state under a control of the controller 252. In a case where the switch 256 is in the ON state, the loading unit 257 stores converted electric power which is input from the DC/DC converter 255.

Figure 4:
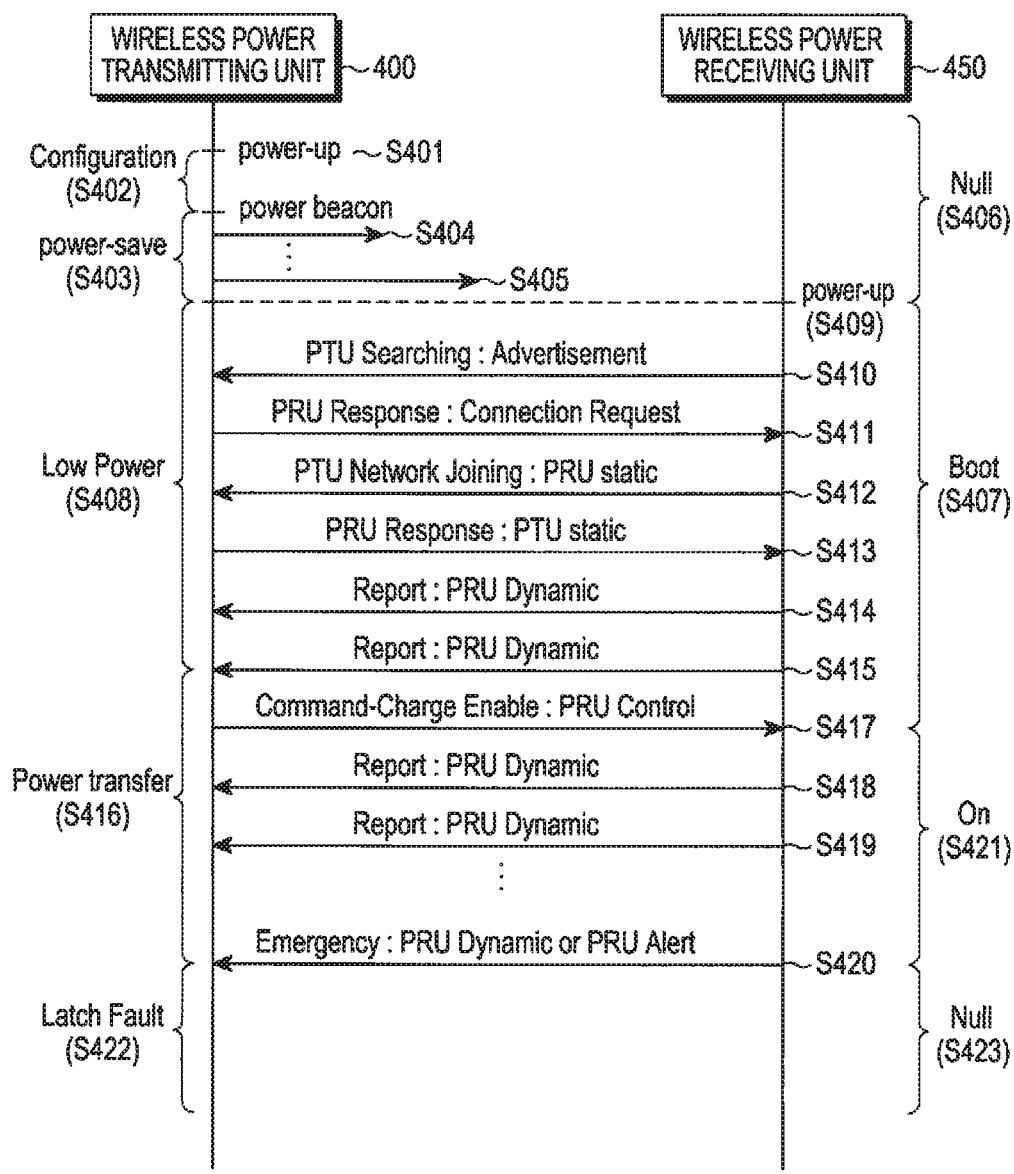
FIG. 4 is a flow diagram illustrating operations of a wireless power transmitting unit and a wireless power receiving unit according to an embodiment of the present invention.

FIG. 4 is a flow diagram illustrating operations of the wireless power transmitting unit and the wireless power receiving unit according to an embodiment of the present invention.

As illustrated in FIG. 4, a wireless power transmitting unit 400 applies power in operation S401. When the power is applied, the wireless power transmitting unit 400 configures an environment in operation S402.

The wireless power transmitting unit 400 enters a power saving mode in operation S403. In the power saving mode, the wireless power transmitting unit 400 applies different types of power beacons for detection according to their own periods, which will be described in more detail with reference to FIG. 6. For example, in FIG. 4, the wireless power transmitting unit 400 applies detection power beacons 404 and 405, and the sizes of power values of the detection power beacons 404 and 405 may be different. A part or all of the detection power beacons 404 and 405 may have power enough to drive the communication unit of the wireless power receiving unit 450. For example, the wireless power receiving unit 450 drives the communication unit by the part or all of the detection power beacons 404 and 405 to communicate with the wireless power transmitting unit 400. The above state is named a null state in operation S406.

The wireless power transmitting unit 400 detects a load change by an arrangement of the wireless power receiving unit 450. The wireless power transmitting unit 400 enters a low power mode in operation S409. The low power mode will be described in more detail with reference to FIG. 6. Meanwhile, the wireless power receiving unit 450 drives the communication unit based on power received from the wireless power transmitting unit 400 in operation S409.

The wireless power receiving unit 450 transmits a PTU searching signal to the wireless power transmitting unit 400 in operation S410. The wireless power receiving unit 450 transmits the PTU searching signal as an advertisement signal based on a Bluetooth Low Energy (BLE) scheme. The wireless power receiving unit 450 transmits the PTU searching signal periodically or until a preset time arrives, and receives a response signal from the wireless power transmitting unit 400.

When receiving the PTU searching signal from the wireless power receiving unit 450, the wireless power transmitting unit 400 transmits a PRU response signal in operation S411. The PRU response signal forms a connection between the wireless power transmitting unit 400 and the wireless power receiving unit 450. The wireless power receiving unit 450 transmits a PRU static signal in operation S412. The PRU static signal is a signal indicating that the wireless power receiving unit 450 is making a request for joining the wireless power network managed by the wireless power transmitting unit 400.

The wireless power transmitting unit 400 transmits a PTU static signal in operation S413. The PTU static signal transmitted by the wireless power transmitting unit 400 is a signal indicating a capability of the wireless power transmitting unit 400.

When the wireless power transmitting unit 400 and the wireless power receiving unit 450 transmit and receive the PRU static signal and the PTU static signal, the wireless power receiving unit 450 periodically transmits a PRU dynamic signal in operations S414 and S415. The PRU dynamic signal includes at least one parameter information measured by the wireless power receiving unit 450. For example, the PRU dynamic signal may include voltage information of a back end of the rectifier of the wireless power receiving unit 450. The state of the wireless power receiving unit 450 is called a boot state in operation S407.

The wireless power transmitting unit 400 enters a power transmission mode in operation S416 and transmits a PRU control signal corresponding to a command signal to allow the wireless power receiving unit 450 to be charged in operation S417. In the power transmission mode, the wireless power transmitting unit 400 transmits charging power.

The PRU control signal transmitted by the wireless power transmitting unit 400 includes information enabling/disabling the charging of the wireless power receiving unit 450 and permission information. The PRU control signal is transmitted whenever a charging state is changed. The PRU control signal is transmitted, for example, every 250 ms, or transmitted when a parameter is changed. The PRU control signal is set to be transmitted within a preset threshold, for example, within one second even though the parameter is not changed.

The wireless power receiving unit 450 changes a configuration according to the PRU control signal and transmits the PRU dynamic signal for reporting the state of the wireless power receiving unit 450 in operations S418 and S419. The PRU dynamic signal transmitted by the wireless power receiving unit 450 includes at least one of information on a voltage, a current, a state of the wireless power receiving unit, and temperature. The state of the wireless power receiving unit 450 is called an ON state in operation S421.

For example, the PRU dynamic signal has a data structure as shown in Table 1 below.

TABLE 1

| Field | octets | description | use | units |
| --- | --- | --- | --- | --- |
| optional fields | 1 | defines which optional fields are populated | mandatory | |

TABLE 1-continued

| Field | octets | description | use | units |
| --- | --- | --- | --- | --- |
| Vrect | 2 | DC voltage at the output of the rectifier | mandatory | mV |
| Irect | 2 | DC current at the output of the rectifier | mandatory | mA |
| Vout | 2 | voltage at charge/battery port | optional | mV |
| Iout | 2 | current at charge/battery port | optional | mA |
| temperature | 1 | temperature of PRU | optional | Deg C. from −40 C. |
| Vrect min dyn | 2 | The current dynamic minimum rectifier voltage desired | optional | mV |
| Vrect set dyn | 2 | desired Vrect (dynamic value) | optional | mV |
| Vrect high dyn | 2 | The current dynamic maximum rectifier voltage desired | optional | mV |
| PRU alert | 1 | warnings | mandatory | Bit field |
| RFU | 3 | undefined | | |

As shown in Table 1, the PRU dynamic signal includes one or more fields. The fields include optional field information, voltage information of a back end of the rectifier of the wireless power receiving unit ('Vrect'), current information of the back end of the rectifier of the wireless power receiving unit ('Irect'), voltage information of a back end of the DC/DC converter of the wireless power receiving unit ('Vout'), current information of the back end of the DC/DC converter of the wireless power receiving unit ('Iout'), temperature information ('temperature'), minimum voltage value information of the back end of the rectifier of the wireless power receiving unit ('Vrect min dyn'), optimal voltage value information of the back end of the rectifier of the wireless power receiving unit ('Vrect set dyn'), maximum voltage value information of the back end of the rectifier of the wireless power receiving unit ('Vrect high dyn'), alert information ('PRU alert') and RFU (Reserved for Future Use). The PRU dynamic signal includes at least one of the above fields.

For example, one or more voltage setting values (for example, the minimum voltage value information (Vrect min dyn) of the back end of the rectifier of the wireless power receiving unit, the optimal voltage value information (Vrect set dyn) of the back end of the rectifier of the wireless power receiving unit, and the maximum voltage value information (Vrect high dyn) of the back end of the rectifier of the wireless power receiving unit) determined according to a charging state is inserted into corresponding fields and then transmitted. As described above, the wireless power receiving unit having received the PRU dynamic signal controls a wireless charging voltage to be transmitted to each of the wireless power receiving units with reference to the voltage setting values included in the PRU dynamic signal.

For example, the alert information (PRU Alert) has a data structure shown in Table 2 below.

TABLE 2

| 7 | 6 | 5 | 4 | 3 | 2 | 1 | 0 |
|---|---|---|---|---|---|---|---|
| over-voltage | over-current | over-temperature | Charge Complete | TA detect | Transition | restart request | RFU |

Referring to Table 2, the alert information (PRU Alert) includes a bit for a restart request, a bit for a transition, and a bit for detecting an insertion of a Travel Adapter (TA) (TA detect). The TA detect indicates a bit informing of a connection between the wireless power transmitting unit providing wireless charging and a terminal for wired charging by the wireless power receiving unit. The transition indicates a bit informing the wireless power transmitting unit that the wireless power receiving unit is reset before a communication Integrated Circuit (IC) of the wireless power receiving unit is switched from a Stand Alone (SA) mode to a Non Stand Alone (NSA) mode. Lastly, the restart request indicates a bit informing the wireless power receiving unit that the wireless power transmitting unit is ready to restart the charging when the charging is disconnected since the wireless power transmitting unit reduces power due to the generation of an over current state or a over temperature state and then the state is returned to an original state.

Further, the alert information (PRU Alert) has a data structure shown in Table 3 below.

TABLE 3

| 7 | 6 | 5 | 4 | 3 | 2 | 1 | 0 |
|---|---|---|---|---|---|---|---|
| PRU over-voltage | PRU over-current | PRU over-temperature | PRU Self Protection | Charge Complete | Wired Charger Detect | Mode Transition Bit 1 | Mode Transition Bit 0 |

Referring to Table 3 above, the alert information includes over voltage, over current, over temperature, PRU self protection, charge compete, wired charger detect, mode transition and the like. When the over voltage field is set as "1", it indicates that a voltage Vrect of the wireless power receiving unit exceeds a limit of the over voltage. Further, the over current and the over temperature may be set in the same way as the over voltage. The PRU self protection indicates that the wireless power receiving unit directly reduces a load of power and thus protects itself. In this event, the wireless power transmitting unit is not required to change a charging state.

Bits for a mode transition according to an embodiment of the present invention are set as a value informing the wireless power transmitting unit of a period during which a mode transition process is performed. The bits indicating the mode transition period are expressed as shown in Table 4 below.

TABLE 4

| Value (Bit) | Mode Transition Bit Description |
|---|---|
| 00 | No Mode Transition |
| 01 | 2 s Mode Transition time limit |
| 10 | 3 s Mode Transition time limit |
| 11 | 6 s Mode Transition time limit |

Referring to Table 4 above, "00" indicates that there is no mode transition, "01" indicates that a time required for completing the mode transition is a maximum of two seconds, "10" indicates that a time required for completing the mode transition is a maximum of three seconds, and "11" indicates that a time required for completing the mode transition is a maximum of six seconds.

For example, when three seconds or less are spent for completing the mode transition, the mode transition bit is set as "10". Prior to starting the mode transition process, the wireless power receiving unit may make a restriction such that there is no change in impedance during the mode transition process by changing an input impedance setting to match 1.1 W power draw. Accordingly, the wireless power transmitting unit controls power (ITX_COIL) for the wireless power receiving unit in accordance with the setting, and accordingly, maintain the power (ITX_COIL) for the wireless power receiving unit during the mode transition period.

Accordingly, when the mode transition period is set by the mode transition bit, the wireless power transmitting unit maintains the power (ITX_COIL) for the wireless power receiving unit during the mode transition time, for example, three seconds. That is, the wireless power transmitting unit maintains a connection even though a response is not received from the wireless power receiving unit for three seconds. However, after the mode transition time passes, the wireless power receiving unit is considered as a rogue object (foreign substance) and thus power transmission is terminated.

Meanwhile, the wireless power receiving unit 450 detects the generation of errors. The wireless power receiving unit 450 transmits an alert signal to the wireless power transmitting unit 400 in operation S420. The alert signal is transmitted as the PRU dynamic signal or the alert signal. For example, the wireless power receiving unit 450 transmits the PRU alert field of Table 3 reflecting an error state to the wireless power transmitting unit 400. Alternatively, the wireless power receiving unit 450 transmits a single alert signal indicating the error state to the wireless power transmitting unit 400. When receiving the alert signal, the wireless power transmitting unit 400 enters a latch fault mode in operation S422, and the wireless power receiving unit 450 enters a null state in operation S423.

Figure 5:
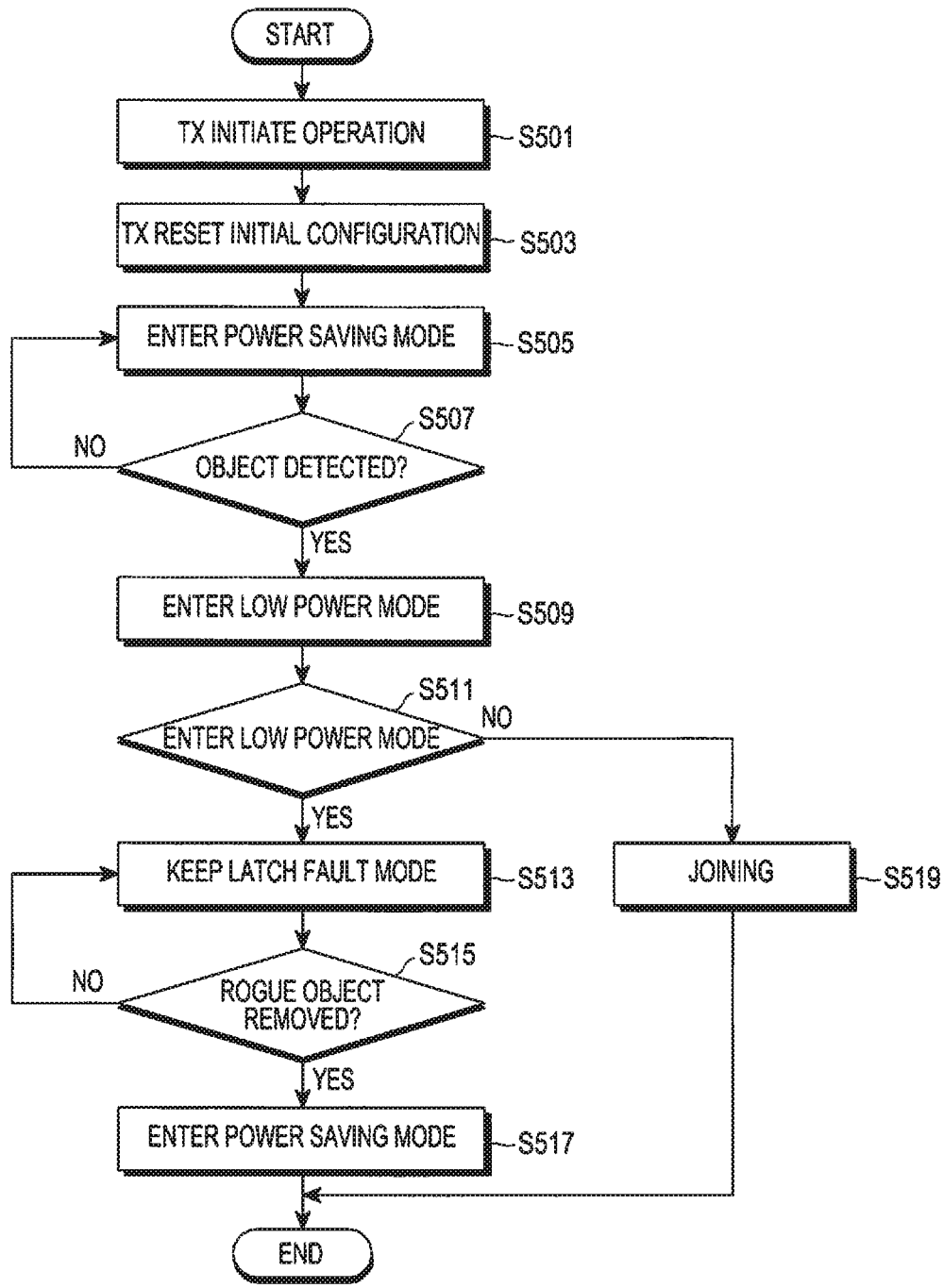
FIG. 5 is a flowchart illustrating operations of a wireless power transmitting unit and a wireless power receiving unit according to another embodiment of the present invention.
Figure 6:
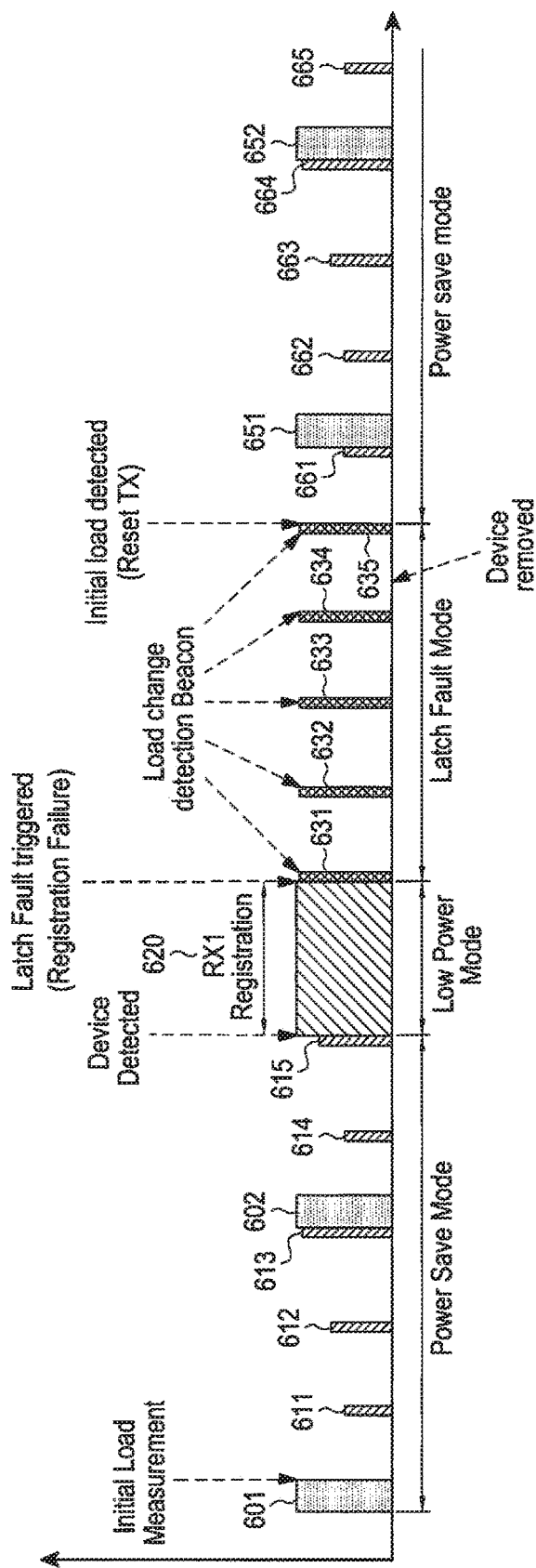
FIG. 6 is a graph on an x axis (or time axis) of an amount of power applied by a wireless power transmitting unit.

FIG. 5 is a flowchart illustrating operations of the wireless power transmitting unit and the wireless power receiving unit according to another embodiment of the present invention. A control method of FIG. 5 will be described in more detail with reference to FIG. 6. FIG. 6 is a graph on an x axis of a power amount applied by the wireless power transmitting unit according to FIG. 5.

As illustrated in FIG. 5, the wireless power transmitting unit initiates the operation in operation S501. Further, the wireless power transmitting unit resets an initial configuration in operation S503. The wireless power transmitting unit enters a power saving mode in operation S505. The power saving mode corresponds to an interval where the wireless power transmitting unit applies power having different amounts to the power transmitter. For example, the power saving mode may correspond to an interval where the wireless power transmitting unit applies second power 601 and 602 and third power 611, 612, 613, 614, and 615 to the power transmitter in FIG. 6. The wireless power transmitting unit periodically applies the second power 601 and 602 according to a second period. When the wireless power transmitting unit applies the second power 601 and 602, the application continues for a second term. The wireless power transmitting unit periodically applies the third power 611, 612, 613, 614, and 615 according to a third period. When the wireless power transmitting unit applies the third power 611, 612, 613, 614, and 615, the application continues for a third term. Meanwhile, although it is illustrated that power values of the third power 611, 612, 613, 614, and 615 are different from each other, the power values of the third power 611, 612, 613, 614, and 615 may be different or the same.

The wireless power transmitting unit may output the third power 611 and then output the third power 612 having the same size of the power amount. As described above, when the wireless power transmitting unit outputs the third power having the same size, the power amount of the third power may have a power amount by which a smallest wireless power receiving unit, for example, a wireless power receiving unit designated as Category 1 can be detected.

The wireless power transmitting unit may output the third power 611 and then output the third power 612 having a different size of the power amount. As described above, when the wireless power transmitting unit outputs the third power having the different size, the power amount of the third power may be a power amount by which a wireless power receiving unit designated as Category 1 to Category 5 can be detected. For example, when the third power 611 may have a power amount by which a wireless power receiving unit of Category 5 can be detected, the third power 612 may have a power amount by which a wireless power receiving unit designated as Category 3 can be detected, and the third power 613 may have a power amount by which a wireless power receiving unit designated as Category 1 can be detected.

Meanwhile, the second power 601 and 602 may be a power amount which can drive the wireless power receiving unit. More specifically, the second power 601 and 602 may have a power amount which can drive the controller and the communication unit of the wireless power receiving unit.

The wireless power transmitting unit applies the second power 601 and 602 and the third power 611, 612, 613, 614, and 615 to the power receiver according to a second period and a third period, respectively. When the wireless power receiving unit is arranged on the wireless power transmitting unit, impedance viewed from a point of the wireless power transmitting unit may be changed. The wireless power transmitting unit detects a change in the impedance while the second power 601 and 602 and the third power 611, 612, 613, 614, and 615 are applied. For example, the wireless power transmitting unit may detect the change in the impedance while the third power 615 is applied. Accordingly, referring back to FIG. 5, the wireless power transmitting unit detects an object in operation S507. When the object is not detected in operation S507, the wireless power transmitting unit maintains a power saving mode in which different power is periodically applied.

When there is a change in the impedance and thus the object is detected in operation S507, the wireless power transmitting unit enters a low power mode in operation S509. The low power mode is a mode in which the wireless power transmitting unit applies driving power having a power amount by which the controller and the communication unit of the wireless power receiving unit can be driven. For example, in FIG. 6, the wireless power transmitting unit applies driving power 620 to the power transmitter. The wireless power receiving unit receives the driving power 620 to drive the controller and the communication unit. The wireless power receiving unit performs communication with the wireless power transmitting unit according to a predetermined scheme based on the driving power 620. For example, the wireless power receiving unit transmits/receives data required for an authentication and joins the wireless power network managed by the wireless power transmitting unit based on the data. However, when a rogue object is arranged instead of the wireless power receiving unit, data transmission/reception cannot be performed. Accordingly, the wireless power transmitting unit determines whether the arranged object is a rogue object in operation S511. For example, when the wireless power transmitting unit does not receive a response from the object within a preset time, the wireless power transmitting unit determines the object as a rogue object.

When the object is determined as a rogue object in operation S511, the wireless power transmitting unit enters a latch fault mode. When the object is not determined as a rogue object in operation S511, the wireless power transmitting unit performs a joining operation in operation S519. For example, the wireless power transmitting unit periodically applies first power 631 to 634 according to a first period in FIG. 6. The wireless power transmitting unit may detect a change in impedance while applying the first power. For example, when the rogue object is withdrawn or removed, the impedance change is detected and the wireless power transmitting unit determines that the rogue object is withdrawn. Alternatively, when the rogue object is not withdrawn, the wireless power transmitting unit does not detect the impedance change and determines that the rogue object is not withdrawn. When the rogue object is not withdrawn, the wireless power transmitting unit outputs at least one of a lamp and a warning sound to inform a user that a state of the wireless power transmitting unit is an error state. Accordingly, the wireless power transmitting unit includes an output unit that outputs at least one of a lamp and a warning sound.

When it is determined that the rogue object is not withdrawn in operation S515, the wireless power transmitting unit maintains the latch fault mode in operation S513. When it is determined that the rogue object is withdrawn in operation S515, the wireless power transmitting unit enters the power saving mode again in operation S517. For example, the wireless power transmitting unit applies second power 651 and 652 and third power 661 to 665, as shown in FIG. 6.

As described above, when the rogue object is arranged instead of the wireless power receiving unit, the wireless power transmitting unit enters the latch fault mode. Further, the wireless power transmitting unit determines whether to withdraw the rogue object by the impedance change based on the power applied in the latch fault mode. That is, a condition of the entrance into the latch fault mode in the embodiment of FIGS. 5 and 6 may be the arrangement of the rogue object. Meanwhile, the wireless power transmitting unit may have various latch fault mode entrance conditions as well as the arrangement of the rogue object. For example, the wireless power transmitting unit may be cross-connected with the arranged wireless power receiving unit and may enter the latch fault mode in the above case.

Accordingly, when cross-connection is generated, the wireless power transmitting unit is required to return to an initial state and the wireless power receiving unit is required to be withdrawn. The wireless power transmitting unit sets the cross-connection by which the wireless power receiving unit arranged on another wireless power transmitting unit joins the wireless power network as the latch fault mode entrance condition. An operation of the wireless power transmitting unit when the error is generated which includes the cross-connection will be described with reference to FIG. 7.

Figure 7:
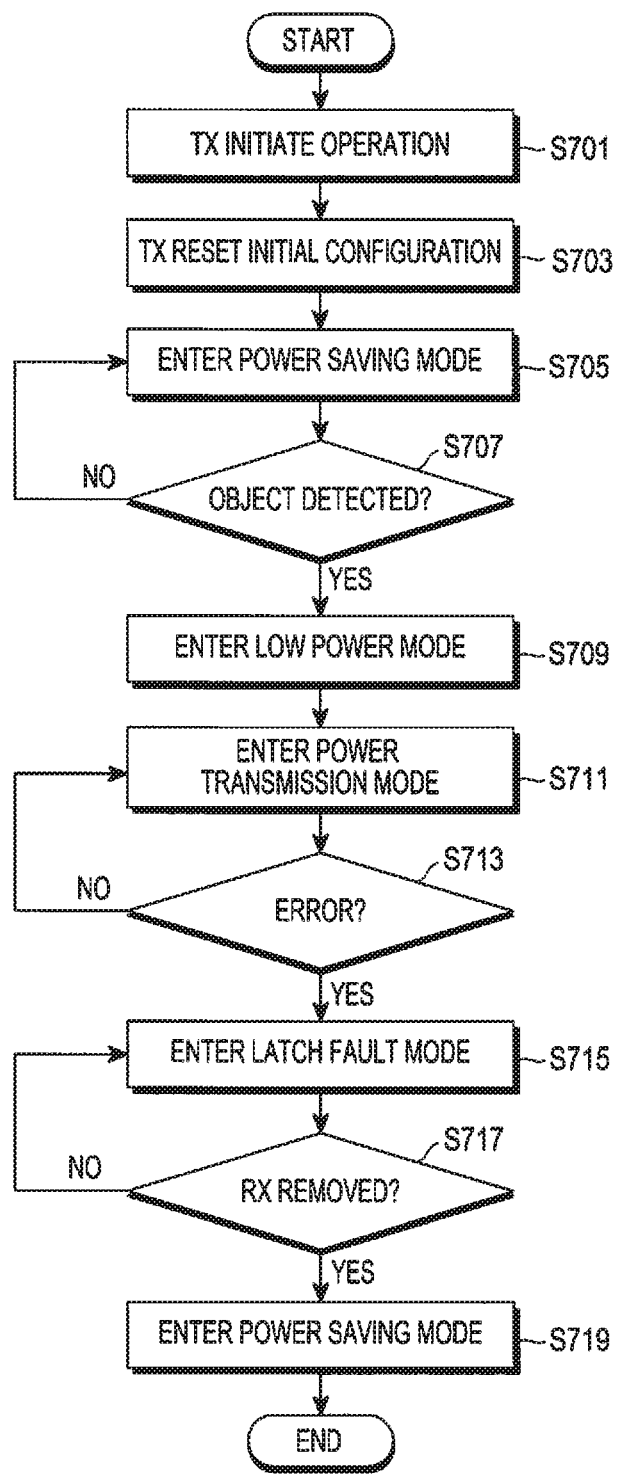
FIG. 7 is a flowchart illustrating a control method of a wireless power transmitting unit according to an embodiment of the present invention.
Figure 8:
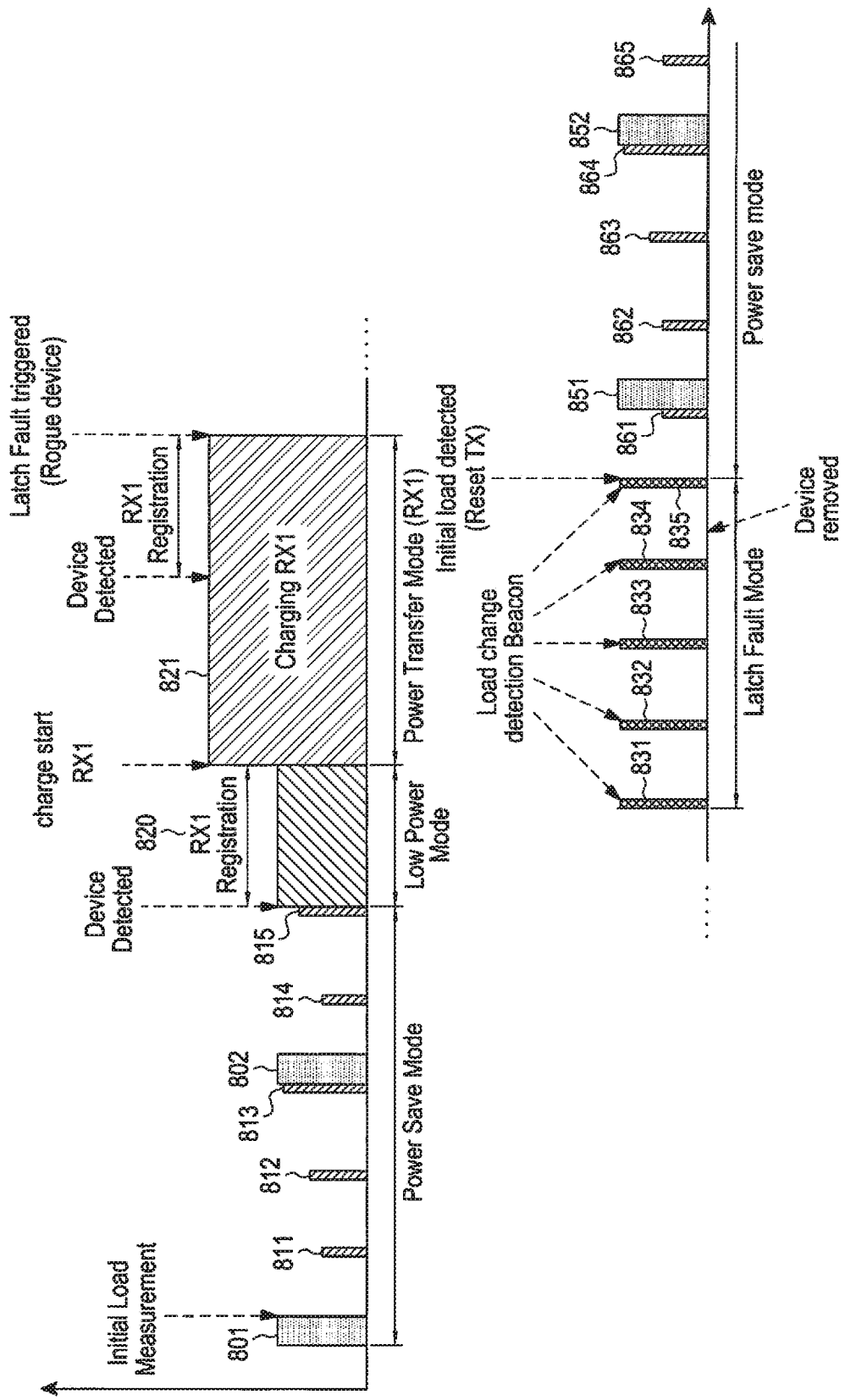
FIG. 8 is a graph on an x axis (or time axis) of an amount of power applied by a wireless power transmitting unit according to the embodiment of FIG. 7.

FIG. 7 is a flowchart illustrating a control method of the wireless power transmitting unit according to an embodiment of the present invention. The control method of FIG. 7 will be described in more detail with reference to FIG. 8. FIG. 8 is a graph on an x axis of a power amount applied by the wireless power transmitting unit according to the embodiment of FIG. 7.

The wireless power transmitting unit initiates the operation in operation S701. Further, the wireless power transmitting unit resets an initial configuration in operation S703. The wireless power transmitting unit enters the power saving mode in operation S705. The power saving mode is an interval where the wireless power transmitting unit applies power having different amounts to the power transmitter. For example, the power saving mode may correspond to an interval where the wireless power transmitting unit applies second power 801 and 802 and third power 811, 812, 813, 814, and 815 to the power transmitter in FIG. 8. The wireless power transmitting unit periodically applies the second power 801 and 802 according to a second period. When the wireless power transmitting unit applies the second power 801 and 802, the application continues for a second term. The wireless power transmitting unit periodically applies the third power 811, 812, 813, 814, and 815 according to a third period. When the wireless power transmitting unit applies the third power 811, 812, 813, 814, and 815, the application continues for a third term. Meanwhile, although it is illustrated that power values of the third power 811, 812, 813, 814, and 815 are different from each other, the power values of the third power 811, 812, 813, 814, and 815 may be different or the same.

The second power 801 and 802 is power which can drive the wireless power receiving unit. More specifically, the second power 601 and 602 has a power amount which can drive the controller and the communication unit of the wireless power receiving unit.

The wireless power transmitting unit applies the second power 801 and 802 and the third power 811, 812, 813, 814, and 815 to the power receiver according to a second period and a third period, respectively. When the wireless power receiving unit is arranged on the wireless power transmitting unit, impedance viewed from a point of the wireless power transmitting unit may be changed. The wireless power transmitting unit detects the impedance change while the second power 801 and 802 and the third power 811, 812, 813, 814, and 815 are applied. For example, the wireless power transmitting unit may detect the impedance change while the third power 815 is applied. Accordingly, referring back to FIG. 7, the wireless power transmitting unit detects an object in operation S707. When the object is not detected in operation S707, the wireless power transmitting unit maintains the power saving mode in which different power is periodically applied in operation S705.

When the impedance is changed and thus the object is detected in operation S707, the wireless power transmitting unit enters the low power mode in operation S709. The low power mode is a mode in which the wireless power transmitting unit applies driving power having a power amount by which the controller and the communication unit of the wireless power receiving unit can be driven. For example, in FIG. 8, the wireless power transmitting unit applies driving power 820 to the power transmitter. The wireless power receiving unit receives the driving power 820 to drive the controller and the communication unit. The wireless power receiving unit performs communication with the wireless power transmitting unit according to a predetermined scheme based on the driving power 820. For example, the wireless power receiving unit transmits/receives data required for an authentication and joins the wireless power network managed by the wireless power transmitting unit based on the data.

Thereafter, the wireless power transmitting unit enters the power transmission mode in which charging power is transmitted in operation S711. For example, the wireless power transmitting unit applies charging power 821 and the charging power is transmitted to the wireless power receiving unit as illustrated in FIG. 8.

The wireless power transmitting unit determines whether an error is generated in the power transmission mode. The error may be the arrangement of a rogue object on the wireless power transmitting unit, the cross-connection, over voltage, over current, over temperature and the like. The wireless power transmitting unit includes a sensing unit that measures the over voltage, the over current, over temperature and the like. For example, the wireless power transmitting unit may measure a voltage or a current at a reference position. When the measured voltage or current is larger than a threshold, it is determined that conditions of the over voltage or the over current are satisfied. Alternatively, the wireless power transmitting unit includes a temperature sensing means which measures temperature at a reference position of the wireless power transmitting unit. When temperature at the reference position is larger than a threshold, the wireless power transmitting unit determines that a condition of the over temperature is satisfied.

When an over voltage, over current, or over temperature state is determined according to a measurement value of the temperature, voltage, or current, the wireless power transmitting unit prevents the over voltage, over current, or over temperature by reducing the wireless charging power by a preset value. At this time, when a voltage value of the reduced wireless charging power is less than a preset minimum value (for example, the minimum voltage value (VRECT MIN DYN) of the back end of the rectifier of the wireless power receiving unit), the wireless charging is interrupted or stopped, so that the voltage setting value is re-controlled according to an embodiment of the present invention.

Although it has been illustrated that the error is generated since the rogue object is additionally arranged on the wireless power transmitting unit in the embodiment of FIG. 8, the type of error is not limited thereto and it will be easily understood by those skilled in the art that the wireless power transmitting unit operates through a similar process with respect to the arrangement of the rogue object, the cross-connection, the over voltage, the over current, and the over temperature.

When the error is not generated in operation S713, the wireless power transmitting unit maintains the power transmission mode in operation S711. Meanwhile, when the error is generated in operation S713, the wireless power transmitting unit enters the latch fault mode in operation S715. For example, the wireless power transmitting unit applies first power 831 to 835 as illustrated in FIG. 8. Further, the wireless power transmitting unit outputs an error generation display including at least one of a lamp and a warning sound during the latch fault mode. When it is determined that the rogue object is not withdrawn in operation S717, the wireless power transmitting unit maintains the latch fault mode in operation S715. Meanwhile, when it is determined that the rogue object is withdrawn in operation S717, the wireless power transmitting unit enters the power saving mode again in operation S719. For example, the wireless power transmitting unit applies second power 851 and 852 and third power 861 to 865 of FIG. 8.

In the above description, the operation in a case where the error is generated while the wireless power transmitting unit transmits the charging power has been discussed. Hereinafter, an operation in a case where a plurality of wireless power receiving units on the wireless power transmitting unit receives charging power will be described.

Figure 9:
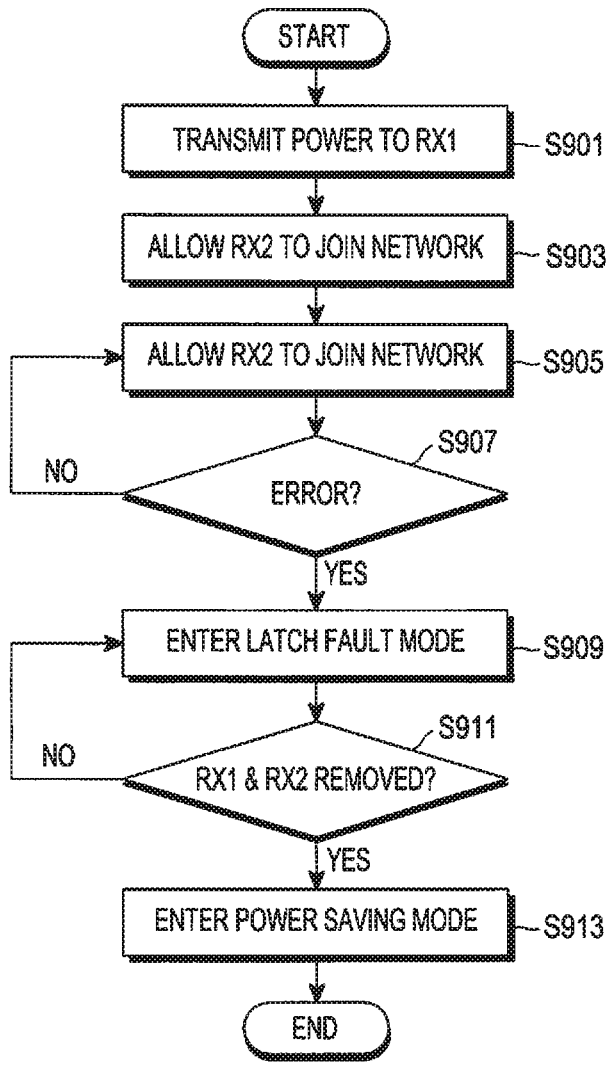
FIG. 9 is a flowchart illustrating a control method of a wireless power transmitting unit according to an embodiment of the present invention.
Figure 10:
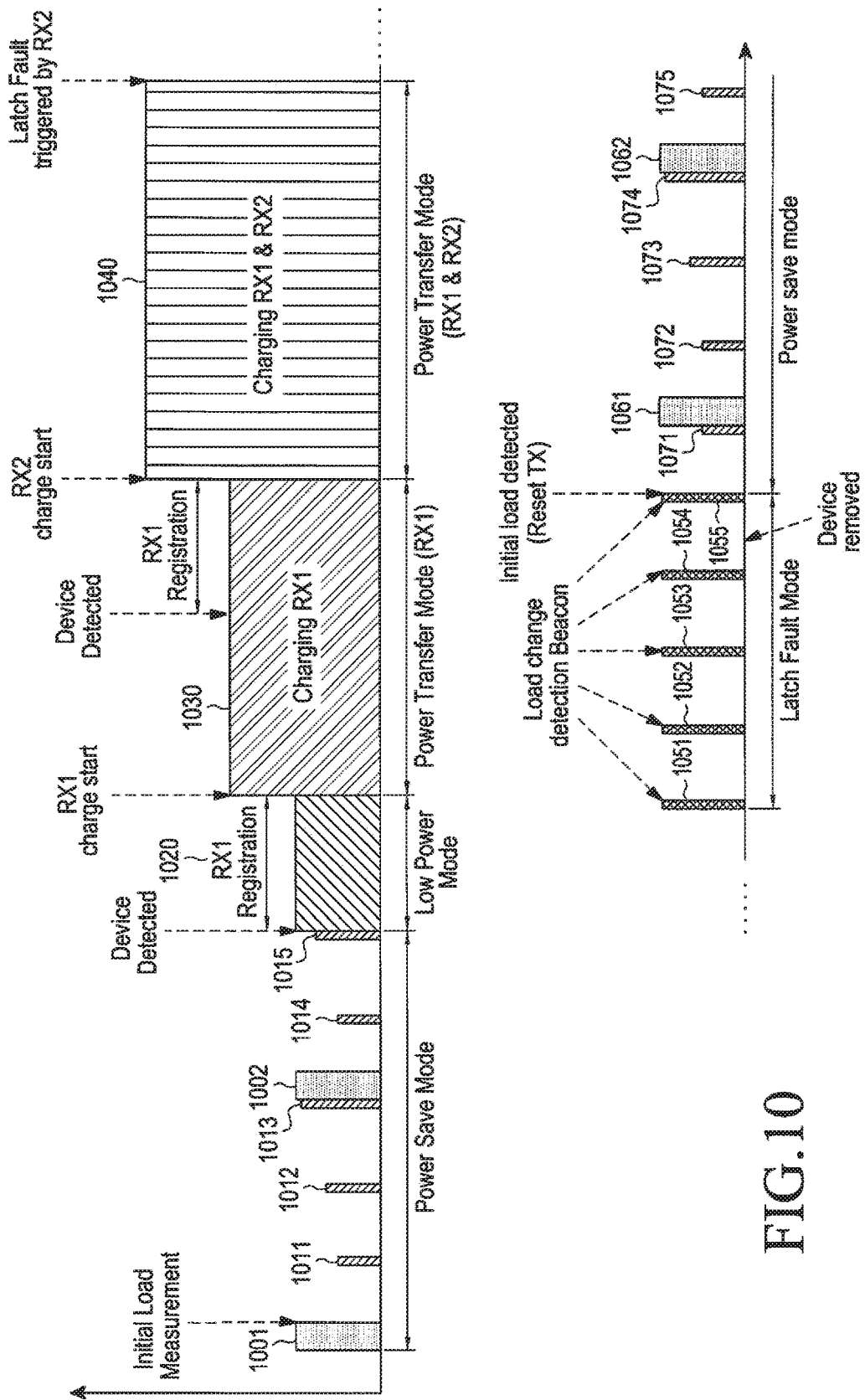
FIG. 10 is a graph on an x axis (or time axis) of an amount of power applied by a wireless power transmitting unit according to the embodiment of FIG. 9.

FIG. 9 is a flowchart for describing a control method of a wireless power transmitting unit according to an embodiment of the present. The control method of FIG. 9 will be described in more detail with reference to FIG. 10. FIG. 10 is a graph on an x axis of an amount of power applied by a wireless power transmitting unit according to the embodiment of FIG. 9.

As illustrated in FIG. 9, the wireless power transmitting unit transmits charging power to a first wireless power receiving unit in operation S901. Further, the wireless power transmitting unit allows a second wireless power receiving unit to additionally join the wireless power network in operation S903. The wireless power transmitting unit transmits charging power to the second wireless power receiving unit in operation S905. More specifically, the wireless power transmitting unit applies a sum of the charging power required by the first wireless power receiving unit and the second wireless power receiving unit to the power receiver.

FIG. 10 illustrates an embodiment of operations S901 to S905. For example, the wireless power transmitting unit maintains the power saving mode in which second power 1001 and 1002 and third power 1011 to 1015 are applied. Thereafter, the wireless power transmitting unit detects the first wireless power receiving unit and enters the low power mode in which a detection power 1020 applied to the first wireless power receiving unit to detect is maintained. Next, the wireless power transmitting unit enters the power transmission mode in which first charging power 1030 is applied. The wireless power transmitting unit detects the second wireless power receiving unit and allows the second wireless power receiving unit to join the wireless power network. Further, the wireless power transmitting unit applies second charging power 1040 having a power amount corresponding to a sum of power amounts required by the first wireless power receiving unit and the second wireless power receiving unit.

Referring back to FIG. 9, the wireless power transmitting unit detects error generation in operation S907 while charging power is transmitted to both the first and second wireless power receiving units in operation S905. As described above, the error may be the arrangement of the rogue object, the cross-connection, the over voltage, the over current, the over temperature and the like. When the error is not generated in operation S907, the wireless power transmitting unit maintains the application of the second charging power 1040.

When the error is generated in operation, the wireless power transmitting unit enters the latch fault mode in operation S909. For example, the wireless power transmitting unit applies first power 1051 to 1055 according to a first period in FIG. 10. The wireless power transmitting unit determines whether both the first wireless power receiving unit and the second wireless power receiving unit are withdrawn in operation S911. For example, the wireless power transmitting unit may detect an impedance change while applying the first power 1051 to 1055. The wireless power transmitting unit determines whether both the first wireless power receiving unit and the second wireless power receiving unit are withdrawn based on whether the impedance is returned to an initial value.

When it is determined that both the first wireless power receiving unit and the second wireless power receiving unit are withdrawn in operation S911, the wireless power receiving unit enters the power saving mode in operation S913. For example, the wireless power transmitting unit applies second power 1061 and 1062 and third power 1071 to 1075 according to a second period and a third period, respectively.

As described above, even when the wireless power transmitting unit applies charging power to at least one wireless power receiving unit, the wireless power transmitting unit determines whether the wireless power receiving unit or the rogue object is easily withdrawn when the error is generated.

Figure 11:
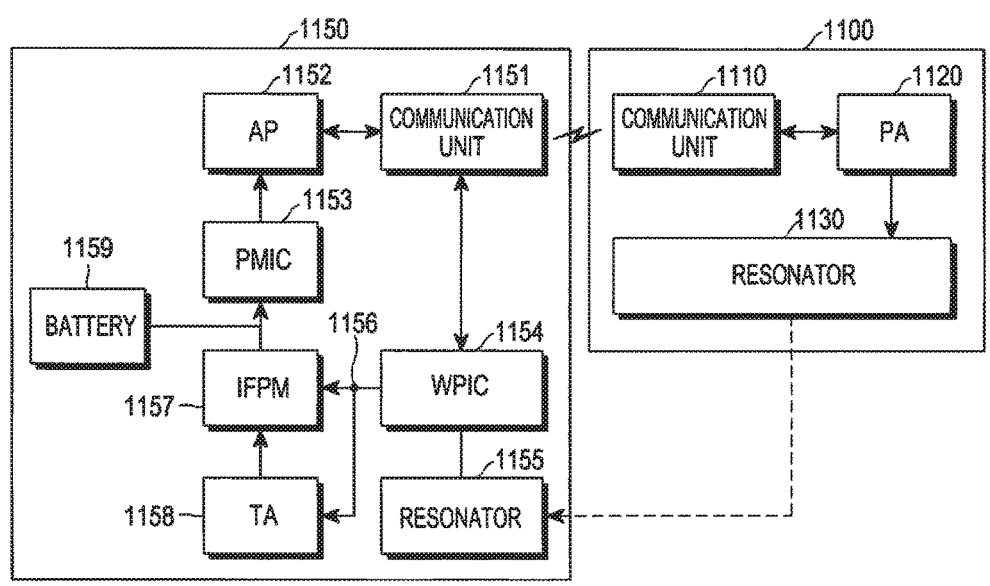
FIG. 11 is a block diagram of a wireless power transmitting unit and a wireless power receiving unit in an SA mode according to an embodiment of the present invention.

FIG. 11 is a block diagram of a wireless power transmitting unit and a wireless power receiving unit in a Stand Alone (SA) mode according to an embodiment of the present invention.

A wireless power transmitting unit 1100 includes a communication unit 1110, a Power Amplifier (PA) 1120, and a resonator 1130. A wireless power receiving unit 1150 includes a communication unit (WPT Communication IC) 1151, an Application Processor (AP) 1152, a Power Management Integrated Circuit (PMIC) 1153, a Wireless Power Integrated Circuit (WPIC) 1154, a resonator 1155, an Inter-Face Power Management (IFPM) IC 1157, a Travel Adapter (TA) 1158, and a battery 1159.

The communication unit 1110 may be implemented by WiFi/BlueTooth (BT) Combo IC and communicates with the communication unit 1151 in a predetermined scheme, for example, a BLE scheme. For example, the communication unit 1151 of the wireless power receiving unit 1150 transmits a PRU dynamic signal having the data structure as shown in Table 3 to the communication unit 1110 of the wireless power transmitting unit 1100. As described above, the PRU dynamic signal includes at least one of voltage information, current information, temperature information, and alert information of the wireless power receiving unit 1150.

Based on the received PRU dynamic signal, a power value output from the power amplifier 1120 is adjusted. For example, when the over voltage, the over current, and the over temperature are applied to the wireless power receiving unit 1150, a power value output from the power amplifier 1120 is reduced. Further, when a voltage or current of the wireless power receiving unit 1150 is less than a preset value, a power value output from the power amplifier 1120 is increased.

Charging power from the resonator 1130 is wirelessly transmitted to the resonator 1155.

The WPIC 1154 rectifies the charging power received from the resonator 1155 and performs DC/DC conversion.

The WPIC 1154 drives the communication unit 1151 or charges the battery 1159 by using the converted power.

A wired charging terminal is inserted into the travel adapter 1158. A wired charging terminal such as 30-pin connector or a Universal Serial Bus (USB) connector is inserted into the travel adapter 1158, and the travel adapter 1158 receives power supplied from an external power source to charge the battery 1159.

The IFPM 1157 processes power applied from the wired charging terminal and outputs the processed power to the battery 1159 and the PMIC 1153.

The PMIC 1153 manages wirelessly received power, power received through a wire, and power applied to each of the components of the wireless power receiving unit 1150. The AP 1152 receives power information from the PMIC 1153 and controls the communication unit 1151 to transmit the PRU dynamic signal for reporting the power information.

The travel adapter 1158 is connected to a node 1156 connected to the WPIC 1154. When the wired charging connector is inserted into the travel adapter 1158, a preset voltage, for example, 5 V may be applied to the node 1156. The WPIC 1154 monitors the voltage applied to the node 1156 to determine whether the travel adapter is inserted.

The AP 1152 has a stack in a predetermined communication scheme, for example, a WiFi/BT/BLE stack. Accordingly, in communication for the wireless charging, the communication unit 1151 loads the stack from the AP 1152 and then communicates with the communication unit 1110 of the wireless power transmitting unit 1100 by using a BT or BLE communication scheme based on the stack.

However, a state may occur in which data for performing wireless power transmission cannot be fetched from the AP 1152 since the AP 1152 is turned off or in which power is lost so that the AP 1152 cannot remain in an ON state while the data is fetched from a memory within the AP 1152.

When a residual capacity of the battery 1159 is less than a minimum power threshold, the AP 1152 is turned off, and the wireless charging can be performed using some components for the wireless charging within the wireless power receiving unit, for example, the communication unit 1151, the WPIC 1154, and the resonator 1155. A state where the AP 1152 cannot be turned on is referred to as a dead battery state.

Since the AP 1152 is not driven in the dead battery state, the communication unit 1151 cannot receive a stack in a predetermined communication scheme, for example, a WiFi/BT/BLE stack from the AP 1152. For such a case, some of the stacks in the predetermined communication scheme, for example, the BLE stack, are fetched within the memory 1162 of the communication unit 1151 from the AP 1152 and stored in the memory 1162. Accordingly, the communication unit 1151 communicates with the wireless power transmitting unit 1100 for the wireless charging by using the stack in the communication scheme stored in the memory 1162, that is, a wireless charging protocol. At this time, the communication unit 1151 includes a memory therewithin, and the BLE stack may be stored in a memory in a form of a ROM in the SA mode.

As described above, a mode in which the communication unit 1151 performs the communication by using the stack of the communication scheme stored in the memory 1162 is referred to as the SA mode. Accordingly, the communication unit 1151 manages a charging process based on the BLE stack.

Figure 12:
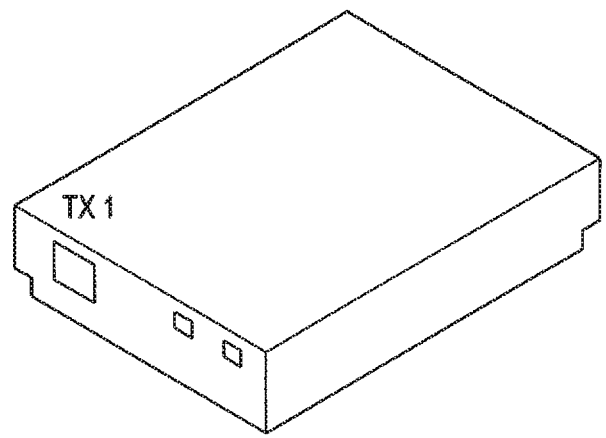
FIG. 12 illustrates a wireless power transmitting unit.
Figure 13:
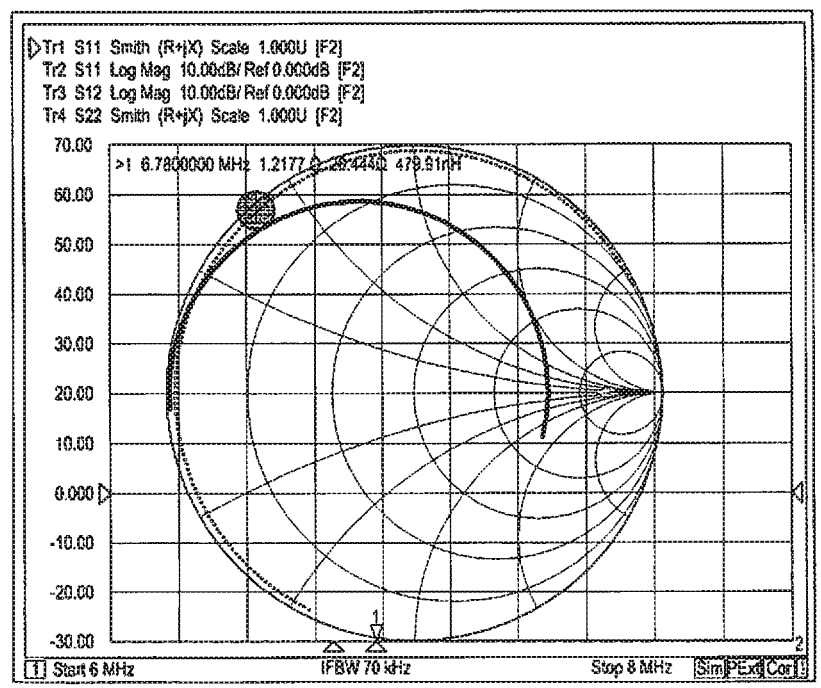
FIG. 13 illustrates impedance detected by a wireless power transmitting unit.
Figure 14:
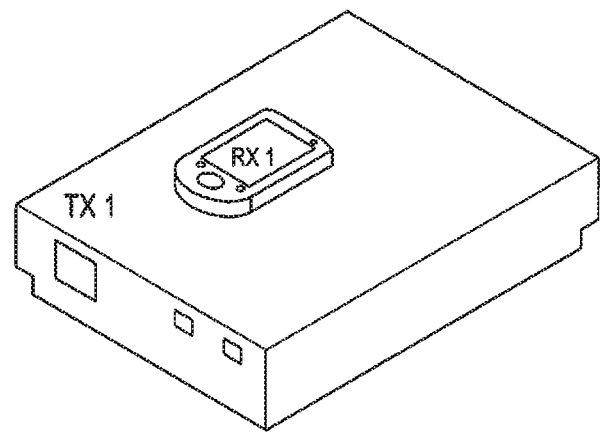
FIG. 14 illustrates a wireless power transmitting unit on which a wireless power receiving unit is placed.
Figure 15:
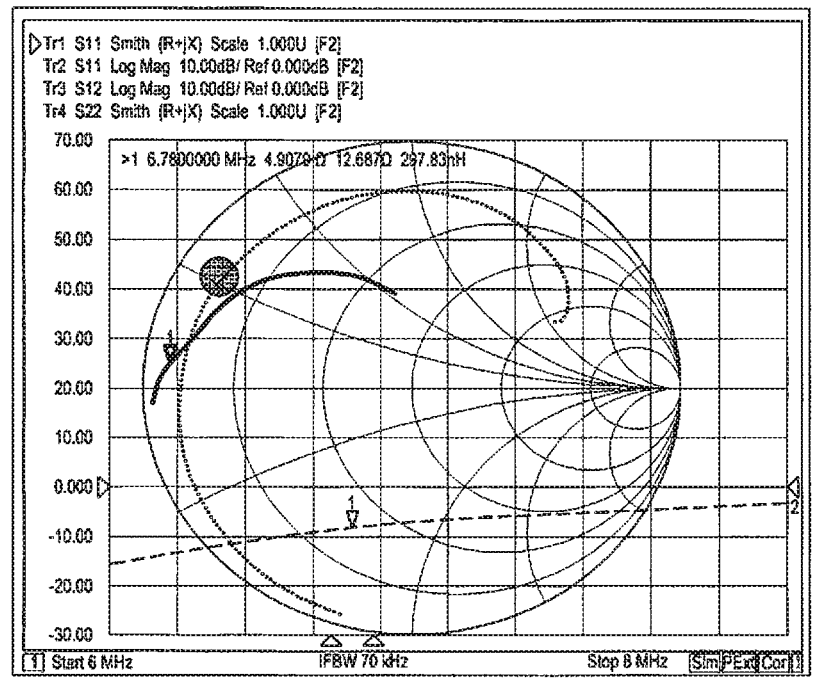
FIG. 15 illustrates impedance detected by a wireless power transmitting unit on which a wireless power receiving unit is placed.

FIGS. 12 and 13 illustrate impedance in a case where no wireless power receiving unit is put on a wireless power transmitting unit, and FIGS. 14 and 15 illustrate impedance in a case where a wireless power receiving unit is put on a wireless power transmitting unit.

Referring to FIGS. 12 to 15, a difference between the impedance that is detected when no PRU is put on a PTU and the impedance that is detected when a PRU is put on the PTU should be large, in order for the PTU to more efficiently detect a load variation of the PRU. For example, the PTU may hardly detect a load if a change in power due to a load variation is insignificant even though a resistance varies. In addition, a point at which there is no change in reactance may exist on the PTU.

Figure 16:
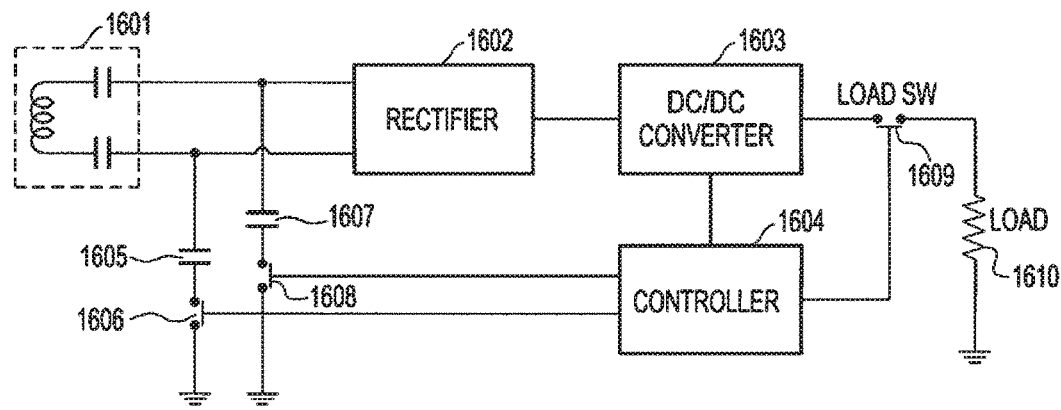
FIG. 16 is a circuit diagram of a wireless power receiving unit to which a dummy load is added according to an embodiment of the present invention.
Figure 17:
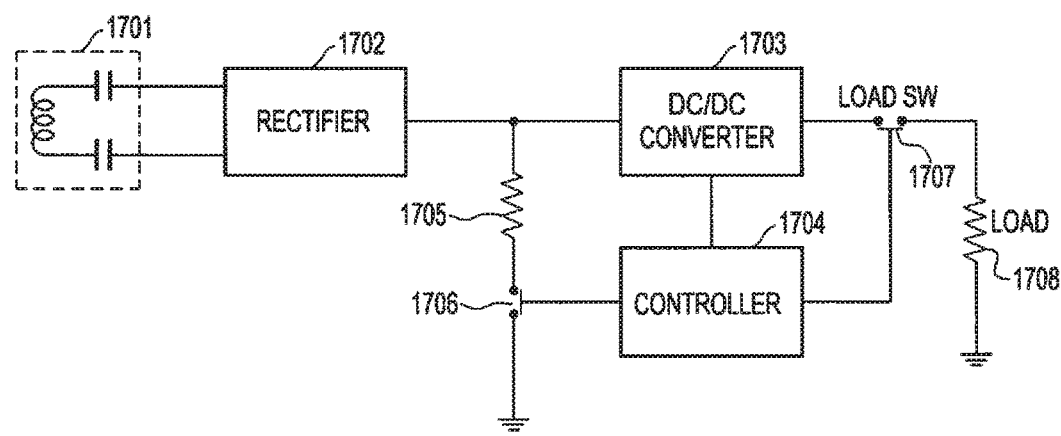
FIG. 17 is a circuit diagram of a wireless power receiving unit to which a dummy load is added according to another embodiment of the present invention.

Therefore, in the below-described embodiments of the present invention, a dummy load is added to a PRU as illustrated in FIGS. 16 and 17, and a PTU efficiently detects the PRU by an operation of a dummy load switch capable of turning on/off the connection to the added dummy load.

FIG. 16 is a circuit diagram of a wireless power receiving unit to which a dummy load is added according to an embodiment of the present invention, and FIG. 17 is a circuit diagram of a wireless power receiving unit to which a dummy load is added according to another embodiment of the present invention.

In order to keep a big difference in impedance between a case where no PRU is put on a PTU and another case where a PRU is put on the PTU as in the Smith charts in FIGS. 13 and 15, a dummy load is additionally connected to the circuit of the PRU as illustrated in FIGS. 16 and 17.

Referring to FIG. 16, the wireless power receiving unit includes a resonator 1601, rectifier 1602, a DC/DC convertor 1603, a controller (or Micro Control Unit (MCU) 1604, and the like. The wireless power transmitted by a wireless power transmitting unit is delivered to the wireless power receiving unit through the resonator 1601, the rectifier 1602 and the DC/DC converter 1603, and if a load switch 1609 is in an ON state, power is supplied to a load 1610.

As illustrated, in the circuit, dummy loads 1605 and 1607 are connected in parallel between the resonator 1601 and the rectifier 1602. Dummy load switches 1606 and 1608 capable of shorting or opening (e.g., turning on/off) the connection of their associated dummy loads 1605 and 1607 are further provided to connection terminals of the dummy loads 1605 and 1607. The dummy load switches 1606 and 1608 are turned on/off by a control signal from the controller 1604.

Therefore, in various wireless charging circumstances, the controller 1604 generates a desired load variation by switching the dummy load switches 1606 and 1608 to an ON or OFF state.

For example, if the dummy load switches 1606 and 1608 are in the ON state under control of the controller 1604, the dummy loads 1605 and 1607 are additionally added to the circuit of the wireless power receiving unit, and the wireless power transmitting unit detects a load by detecting a variation in the load of the wireless power receiving unit.

Referring to FIG. 16, capacitors as AC dummy loads serves as the dummy loads 1605 and 1607. Values (e.g., AC dummy load values) of the AC dummy loads 1605 and 1607 may be, for example, 1 nF~2.2 nF at a frequency of 6.78 MHz.

Referring to FIG. 17, the wireless power receiving unit includes a resonator 1701, a rectifier 1702, a DC/DC convertor 1703, a controller (or Micro Control Unit (MCU)) 1704, and the like. As in FIG. 16, the wireless power transmitted by a wireless power transmitting unit is delivered to the wireless power receiving unit through the resonator 1701, the rectifier 1702 and the DC/DC converter 1703, and if a load switch 1707 is in the ON state, power is supplied to a load 1708.

As illustrated, in the circuit, a dummy load 1705 is connected in parallel between the rectifier 1702 and the DC/DC converter 1703. A dummy load switch 1706 capable of shorting or opening (e.g., turning on/off) the connection of the dummy load 1705 is further provided to a connection terminal of the dummy load 1705. The dummy load switch 1706 is turned on/off by a control signal from the controller 1704.

Therefore, in various wireless charging circumstances, the controller 1704 generates a desired load variation by switching the dummy load switch 1706 to the ON or OFF state.

For example, if the dummy load switch 1706 is in the ON state under control of the controller 1704, the dummy load 1705 is additionally added to the circuit of the wireless power receiving unit, and the wireless power transmitting unit detects a load by detecting a variation in the load of the wireless power receiving unit.

Referring to FIG. 17, a resistor as a DC dummy load serves as the dummy load 1705. A value (e.g., DC dummy load value) of the DC dummy load 1705 may be, for example, 70 Ohms at a frequency of 6.78 MHz.

As for the dummy loads, if power is applied to the PRU, the dummy load circuit is opened by switching the dummy load switches to the OFF state, so the dummy loads are not detected by the PTU. In other words, the dummy loads do not affect the impedance measured by the PTU.

The dummy load switches may be situated in at least one of the AC dummy load circuit (FIG. 16) and the DC dummy load circuit (FIG. 17) as illustrated in FIGS. 16 and 17. In accordance with various embodiments of the present invention, if power is applied to the PRU, the dummy load switches are opened. Otherwise, the dummy load switches are opened by a control signal from the MCU, after the MCU is turned on as the power is applied to the PRU.

The DC dummy load switch is designed to keep the short state if no power is applied to the PRU. If power is applied to the PRU for a short period of time by a beacon transmitted by the PTU, the dummy load switch is switched from the short state to the open state, allowing the PTU to detect a large load variation.

Reference will now be made to FIGS. 18 to 25, to describe examples of detecting a load variation using a dummy load according to various embodiments of the present invention.

Figure 18:
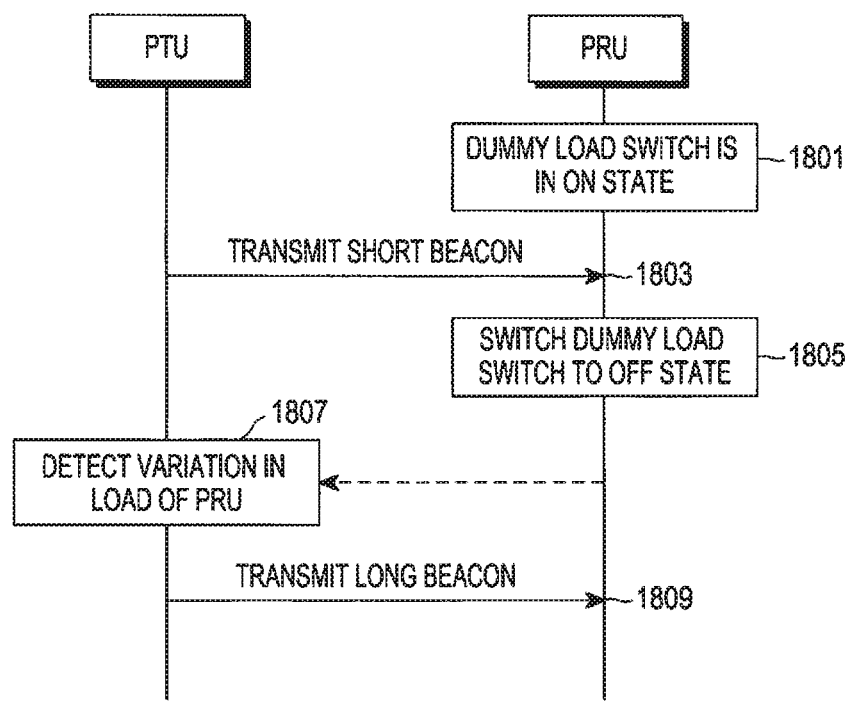
FIG. 18 is a flow diagram illustrating a procedure for detecting a load variation according to a first embodiment of the present invention.

FIG. 18 is a flow diagram illustrating a procedure for detecting a load variation according to a first embodiment of the present invention. Referring to FIG. 18, upon receiving power from a PTU in operation 1803 while a dummy load switch is in the ON state in operation 1801, a dummy load circuit added to a PRU switches the dummy load switch to the OFF state in operation 1805. The power transmitted from the PTU is a short beacon signal.

If the dummy load switch is switched to the OFF state, the PTU performs a procedure for charging wireless power, by detecting a load variation of the PRU in operation 1807. For example, the PTU performs the wireless power charging procedure with the PRU, by transmitting a long beacon to the PRU in operation 1809.

Figure 19:
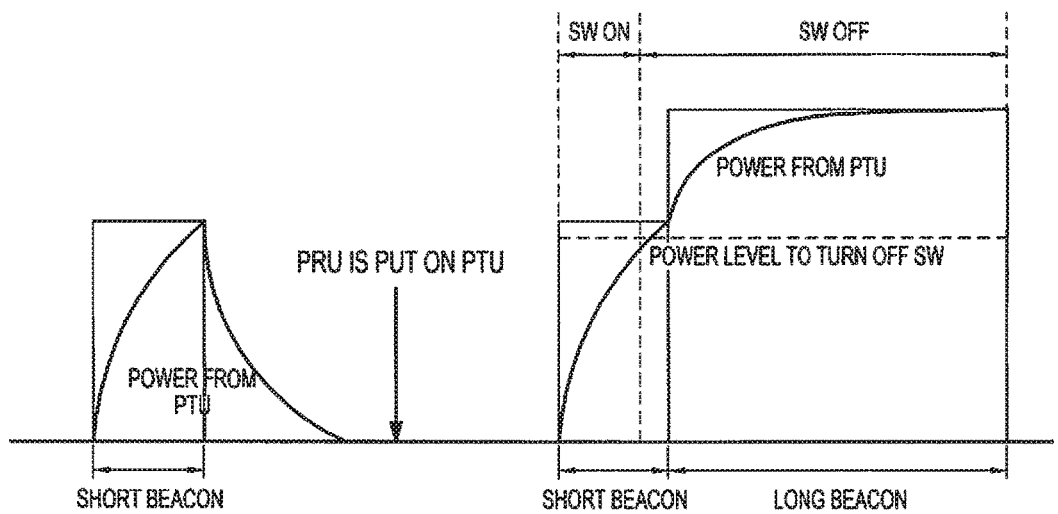
FIG. 19 is a graph illustrating an example of detecting a load variation according to the first embodiment of the present invention.

FIG. 19 is a graph illustrating an example of detecting a load variation according to the first embodiment of the present invention. Referring to FIG. 19, a PTU monitors a variation in load by periodically generating power for a short period of time. For example, the PTU detects a load variation by transmitting a short beacon signal.

If the user puts a PRU on the PTU as illustrated in FIG. 14, or puts the PRU in close proximity to a field of the PTU, the dummy load switch added to the PRU is switched from the short state (e.g., 30 to 70 Ohms) to the open state (e.g., 100 Ohms) according to an embodiment of the present invention, generating a variation in load.

In accordance with various embodiments of the present invention, if a PRU is put on a PTU while the PTU exists alone, the PTU detects a load given when the dummy load switch is in the short state, before power is sufficiently applied to the PRU, and the PTU detects a load variation at the moment the dummy load switch is switched from the short state to the open state as power is applied to the PRU.

As illustrated in FIG. 19, upon detecting a variation in load, the PTU drives the controller (e.g., MCU) by applying move power to the PRU. For example, the PTU drives the controller of the PRU by transmitting a long beacon signal.

Thereafter, communication between a PTU and a PRU is attempted, and it is determined whether an authenticated device is put on the PTU, for charging. If the authentication is completed, charging begins.

Figure 20:
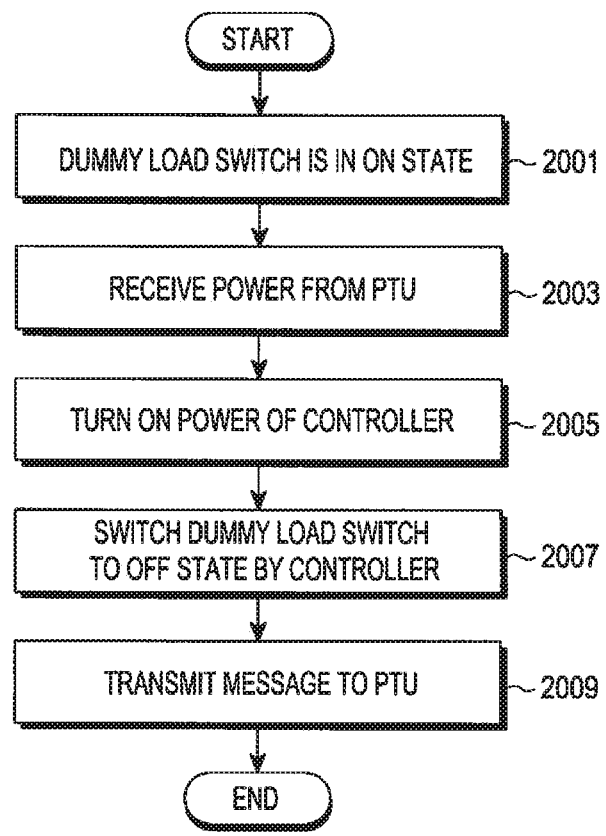
FIG. 20 is a flowchart illustrating a procedure for detecting a load variation according to an embodiment of the present invention.
Figure 21:
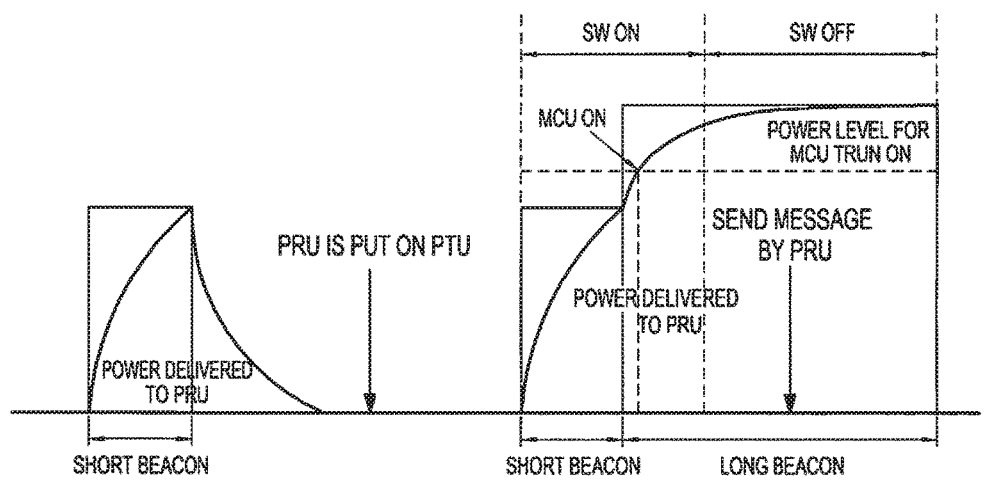
FIG. 21 is a graph illustrating an example of detecting a load variation according to the second embodiment of the present invention.
Figure 22:
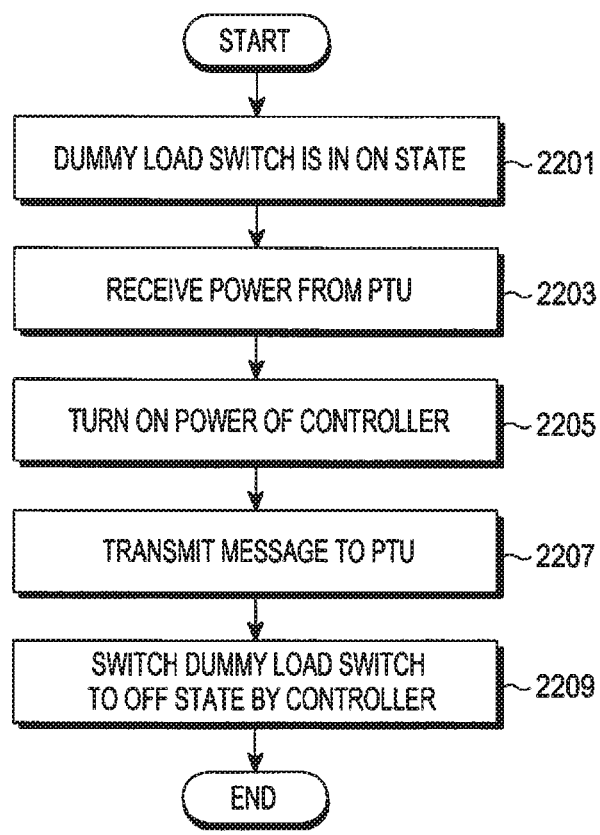
FIG. 22 is a flowchart illustrating a procedure for detecting a load variation according to a third embodiment of the present invention.
Figure 23:
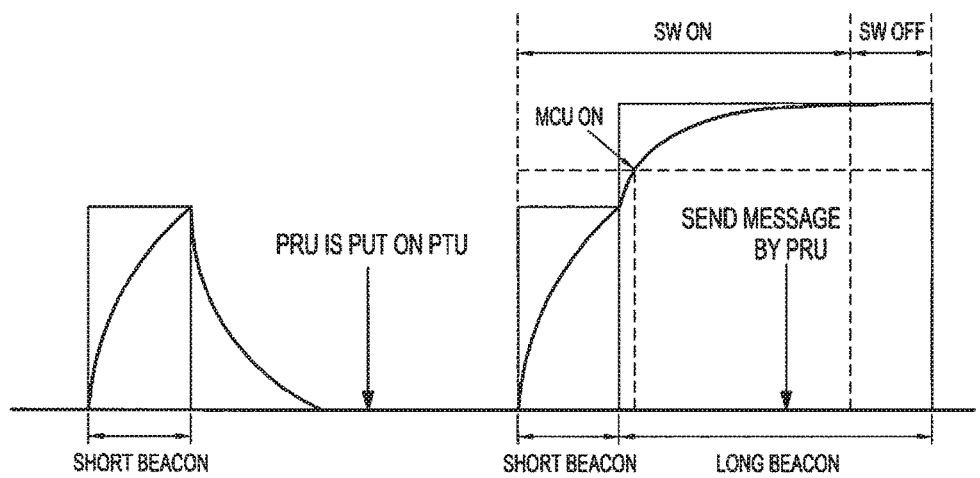
FIG. 23 is a graph illustrating an example of detecting a load variation according to an embodiment of the present invention.

FIGS. 20 and 21 illustrate an example of detecting a load variation according to a second embodiment of the present invention, and FIGS. 22 and 23 illustrate an example of detecting a load variation according to a third embodiment of the present invention. The second and third embodiments of the present invention correspond to methods of controlling the dummy load switch after the controller (e.g., MCU) is turned on (or driven).

Referring to FIG. 20, upon receiving power from a PTU in operation 2003 while the dummy load switch is in the ON state in operation 2001, a dummy load circuit added to a PRU turns on power of the controller according to the second embodiment of the present invention in operation 2005.

The controller is driven as the power of the controller is turned on, and the controller varies a load of the PRU by switching the dummy load switch to the OFF state in operation 2007.

If the dummy load switch is switched to the OFF state, the PTU performs a procedure for charging wireless power, by detecting a load variation of the PRU. Thereafter, the PRU performs the wireless power charging procedure with the PTU by transmitting a message (e.g., advertisement message) to the PTU in operation 2009.

FIG. 21 illustrates a method of controlling a dummy load switch after the MCU is turned on according to the second embodiment of the present invention, as described in conjunction with FIG. 20. In this method, after the MCU is turned on, the MCU generates a variation in load by generating a control signal for opening the dummy load switch. Next, the PRU transmits a message (e.g., advertisement message) to the PTU.

The third embodiment illustrated in FIGS. 22 and 23 corresponds to another method of controlling the dummy load switch after the MCU is turned on. In this method, after the MCU is turned on, the PRU transmits a message (e.g., advertisement message) to the PTU, and opens the dummy load switch after the message is transmitted, thereby generating a variation in load. Using the information included in the message that the PRU has transmitted, the PTU determines whether the PRU is a PRU capable of generating a load variation.

Referring to FIG. 22, upon receiving power from a PTU in operation 2203 while a dummy load switch is in the ON state in operation 2201, a dummy load circuit added to a PRU turns on power of the controller according to the third embodiment of the present invention in operation 2205.

The controller is driven as the power of the controller is turned on, and the PRU performs the wireless power charging procedure with the PTU by transmitting a message (e.g., advertisement message) to the PTU in operation 2207.

Thereafter, the controller varies a load of the PRU by switching the dummy load switch to the OFF state in operation 2009.

If the dummy load switch is switched to the OFF state, the PTU performs the procedure for charging wireless power, by detecting a load variation of the PRU.

FIG. 23 illustrates a method of controlling a dummy load switch after the MCU is turned on according to the third embodiment of the present invention, as described in conjunction with FIG. 22. In this method, after the MCU is turned on, the PRU transmits a message (e.g., advertisement message) to the PTU. After transmitting the message, the controller of the PRU generates a variation in load by generating a control signal for opening the dummy load switch. The PTU performs the procedure for charging wireless power by detecting the load variation of the PRU, which is caused by the switching of the dummy load switch of the PRU.

Figure 24:
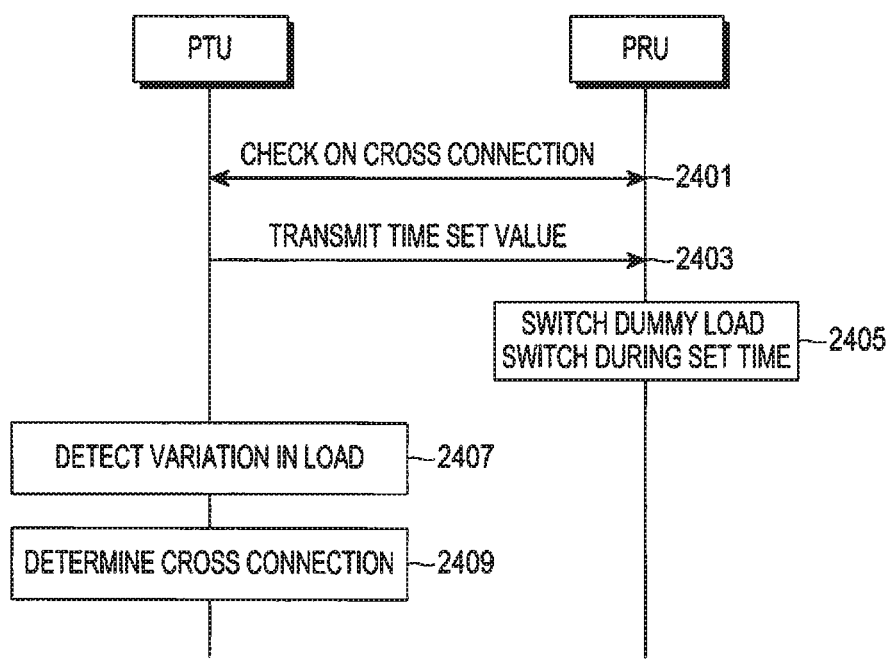
FIG. 24 is a flow diagram illustrating a procedure for detecting a load variation according to an embodiment of the present invention.
Figure 25:
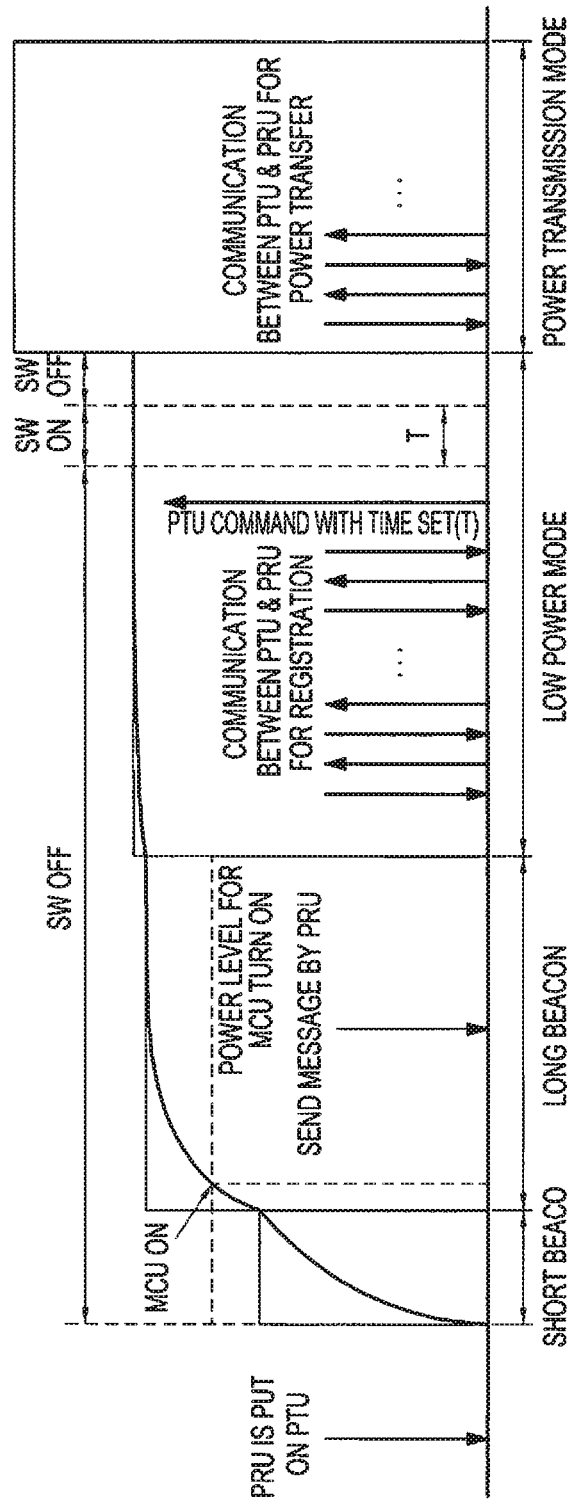
FIG. 25 is a graph illustrating an example of detecting a load variation according to an embodiment of the present invention.

FIG. 24 is a flow diagram illustrating a procedure for detecting a load variation according to a fourth embodiment of the present invention, and FIG. 25 is a graph illustrating an example of detecting a load variation according to the fourth embodiment of the present invention.

Referring to FIG. 24, upon occurrence of a circumstance in operation 2401, in which cross connection should be checked for a PTU and a PRU, the PTU transmits a time set value to the PRU in operation 2403.

Upon receiving the time set value from the PTU, the PRU generates a load variation depending on the received time set value. The PRU generates a load variation of the PRU by switching the dummy load switch to the ON or OFF state as described above, in operation 2405.

The PTU detects the load variation of the PRU, which is caused by the switching of the dummy load switch of the PRU, in operation 2407, and determine in operation 2409 whether the PRU is cross-connected.

Referring to FIG. 25, a load variation for prevention of cross connection is detected during the low power mode.

For example, while a PRU receives power transmitted from a first PTU on which the PRU is actually put, the PRU communicates with a second PTU, or vice versa. This is called cross connection.

If cross connection occurs, the system may be unstable. Therefore, in order to determine whether a PTU and a PRU are cross-connected, the PTU, as described above, provides a time set value T to the PRU and determines based thereon whether cross connection has occurred. In other words, if the PRU that has received the time set value T generates a variation in load for the time T, the PTU monitors the variation in load to determine whether the value T that the PTU has sent to the PRU is coincident with the period for which the variation in load has occurred, thereby making it possible to determine whether cross connection has occurred.

In order to generate a load variation, the MCU of the PRU performs the above-described operation of turning on/off (e.g., shorting or opening) the dummy load switch, thereby making it possible to artificially generate a variation in load.

In addition, the switching operation of turning on/off the dummy load switch may be repeatedly performed as illustrated in FIG. 25, allowing the PTU to recognize the switching of the dummy load switch.

As is apparent from the foregoing description, an aspect of the present invention provides a method for generating a load variation used for detecting a wireless power receiving unit in a wireless charging network.

In other words, in accordance with an embodiment of the present invention, a dummy load is added to a wireless power receiving unit (or PRU), allowing a wireless power transmitting unit (or PTU) to detect a load depending on a change in impedance, making it possible for the PTU to detect a large change impedance.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of controlling a wireless power receiver, the method comprising:
   receiving, by a power receiver, power from a wireless power transmitter;
   receiving, from the wireless power transmitter, a time set value that is set for checking cross connection;
   in response to receiving the time set value, generating a power variation in the wireless power receiver by converting a load status from a first load status to a second load status; and
   maintaining the second load status for a time corresponding to the received time set value.

2. The method of claim 1, further comprising:
   returning to the first load status, upon a lapse of the time corresponding to the received time set value.

3. The method of claim 1, wherein converting the load status comprises switching a switch connected to a dummy load to an ON state in response to receiving the time set value, and
   wherein maintaining the second load status comprises maintaining the ON state for the time corresponding to the received time set value.

4. The method of claim 3, further comprising:
   switching the switch to an OFF state, upon a lapse of time corresponding to the received time set value.

5. The method of claim 1, wherein the power variation in the wireless power receiver is caused by a load variation due to the conversion of the load status.

6. A wireless power receiver, comprising:
   a power receiver configured to receive power from a wireless power transmitter;
   a communication module configured to receive, from the wireless power transmitter, a time set value that is set for checking cross connection; and
   a controller configured to:
   generate a power variation in the wireless power receiver by converting a load status from a first load status to a second load status, and
   maintain the second load status for time corresponding to the received time set value.

7. The wireless power receiver of claim 6, wherein the controller is further configured to return to the first load status, upon a lapse of the time corresponding to the received time set value.

8. The wireless power receiver of claim 6, further comprising:
   a dummy load connected in parallel between the power receiver and a load of the wireless power receiver; and a switch configured to selectively connect the dummy load to the power receiver.

9. The wireless power receiver of claim 8, wherein the controller is further configured to generate the load variation by switching the switch from an OFF state to an ON state and to maintain the ON state for the time corresponding to the received time set value.

10. The wireless power receiver of claim 9, wherein the controller is further configured to return to the first load status by switching the switch from the ON state to the OFF state, upon a lapse of the time corresponding to the received time set value.

11. The wireless power receiver of claim 6, wherein the power variation in the wireless power receiver is caused by a load variation due to the conversion of the load status.

12. A method for controlling a wireless power transmitter, the method comprising:
    transmitting, to a wireless power receiver, a time set value that is set for checking cross connection;
    detecting a load variation of the wireless power receiver;
    comparing the time set value with a period of the load variation;
    determining whether the wireless power receiver is cross-connected, based on the comparison result; and
    in response to determining that the wireless power receiver is cross-connected, transmitting a power receiving unit (PRU) control signal with a permission field indicating that the wireless power receiver is not permitted due to the cross connection.

13. The method of claim 12, further comprising:
    transmitting power to the wireless power receiver, in response to determining that the wireless power receiver is not cross-connected.

14. A wireless power transmitter, comprising:
    a communication module configured to transmit, to a wireless power reciever, a time set value that is set for checking cross connection; and
    a controller configured to:
    detect a load variation of the wireless power receiver,
    compare the time set value with a period of the load variation,
    determine whether the wireless power receiver is cross-connected, based on the comparison result, and
    in response to determining that the wireless power receiver is cross-connected, transmit, through the communication module, a power receiving unit (PRU) control signal with a permission field indicating that the wireless power receiver is not permitted due to the cross connection.

15. The wireless power transmitter of claim 14, further comprising a power transmitter, and,
    wherein the controller is further configured to transmit, through the power transmitter, power, in response to determining that the wireless power receiver is not cross-connected.

* * * * *

UNITED STATES PATENT AND TRADEMARK OFFICE
CERTIFICATE OF CORRECTION

PATENT NO. : 10,236,724 B2
APPLICATION NO. : 15/704885
DATED : March 19, 2019
INVENTOR(S) : Kyung-Woo Lee et al.

Page 1 of 1

It is certified that error appears in the above-identified patent and that said Letters Patent is hereby corrected as shown below:

Column 25, Line 17, --reciever-- should be -receiver-

Column 26, Line 7, --reciever-- should be -receiver-

Signed and Sealed this
Seventh Day of April, 2020

Andrei Iancu
*Director of the United States Patent and Trademark Office*